(12) United States Patent
Pepe

(10) Patent No.: US 10,075,115 B2
(45) Date of Patent: Sep. 11, 2018

(54) COGENERATION SYSTEM CONFIGURED TO BE INSTALLED INTO AN EXISTING BOILER PLANT/EMERGENCY GENERATOR INSTALLATION AND PROCESS FOR COGENERATION

(71) Applicant: PAC, LLC, Wilmington, DE (US)

(72) Inventor: Christopher Mark Pepe, Kennet Square, PA (US)

(73) Assignee: PAC, LLC, Wilmington, DE (US)

( * ) Notice: Subject to any disclaimer, the term of this patent is extended or adjusted under 35 U.S.C. 154(b) by 0 days.

(21) Appl. No.: 15/069,128

(22) Filed: Mar. 14, 2016

(65) Prior Publication Data

US 2016/0301344 A1 Oct. 13, 2016

Related U.S. Application Data

(63) Continuation-in-part of application No. 13/684,276, filed on Nov. 23, 2012, now Pat. No. 9,285,847.
(Continued)

(51) Int. Cl.
  *H02P 9/04* (2006.01)
  *G05D 23/19* (2006.01)
  (Continued)

(52) U.S. Cl.
  CPC .............. *H02P 9/04* (2013.01); *F01N 3/0205* (2013.01); *F01N 5/02* (2013.01); *F02G 5/04* (2013.01);
  (Continued)

(58) Field of Classification Search
  CPC .......... G06F 1/26; F24D 19/1087; F24D 5/04; F24D 19/1081; G05D 23/1923;
  (Continued)

(56) References Cited

U.S. PATENT DOCUMENTS 4,510,756 A * 4/1985 Hise ........................ F24D 11/00
  237/12.1
4,736,111 A * 4/1988 Linden .................... F02B 63/04
  290/2
(Continued)

FOREIGN PATENT DOCUMENTS

| JP | 2002180681 A | 6/2002 |
| RU | 2182986 | 5/2002 |
| RU | 2326246 C1 | 6/2008 |

OTHER PUBLICATIONS

International Search Report of PCT/US2013/045232, dated Sep. 26, 2013.
(Continued)

*Primary Examiner* — Ramesh Patel
(74) *Attorney, Agent, or Firm* — Collard & Roe, P.C.

(57) ABSTRACT

At least one embodiment relates to a cogeneration system configured to be coupled to an electrical input of a building and configured to be coupled to a heating or cooling system of a building. The cogeneration system can comprise a generator configured to generate electrical energy. There can be also a fluid output and a fluid input that passes through the generator and configured to absorb heat from the generator. There can also be an electrical output coupled to the electrical input of the building wherein when the generator is operational, the engine creates both heat and electricity. There can also be a processor in communication with the generator, wherein the processor controls when the generator turns on and off based upon the amount of heat or cooling needed, the cost of fuel and the existing electrical rates. These costs can be obtained using communication with real time rates over the internet.

7 Claims, 23 Drawing Sheets

Related U.S. Application Data

(60) Provisional application No. 61/659,633, filed on Jun. 14, 2012.

(51) Int. Cl.

| | | |
|---|---|---|
| *G05B 15/02* | (2006.01) | |
| *F01N 3/02* | (2006.01) | |
| *F01N 5/02* | (2006.01) | |
| *F02G 5/04* | (2006.01) | |
| *F24D 5/04* | (2006.01) | |
| *F24D 19/10* | (2006.01) | |
| *G06Q 50/06* | (2012.01) | |
| *H02P 9/08* | (2006.01) | |
| *F25B 27/02* | (2006.01) | |

(52) U.S. Cl.
CPC ........... *F24D 5/04* (2013.01); *F24D 19/1081* (2013.01); *F24D 19/1087* (2013.01); *G05B 15/02* (2013.01); *G05D 23/1923* (2013.01); *G06Q 50/06* (2013.01); *F02G 2260/00* (2013.01); *F24H 2240/06* (2013.01); *F25B 27/02* (2013.01); *H02P 9/08* (2013.01); *Y02A 30/274* (2018.01); *Y02B 30/52* (2013.01); *Y02E 20/14* (2013.01); *Y02T 10/166* (2013.01)

(58) Field of Classification Search
CPC ........ G05D 23/19; G06Q 50/06; F25B 27/02; F24H 2240/06; H02P 9/08; Y02E 20/14
See application file for complete search history.

(56) References Cited

U.S. PATENT DOCUMENTS

| | | | |
|---|---|---|---|
| 5,632,870 A * | 5/1997 | Kucherov | C25B 1/02 204/241 |
| 6,053,418 A * | 4/2000 | Guyer | F01K 17/02 237/12.1 |
| 6,739,389 B2 | 5/2004 | Nakagawa et al. | |
| 6,891,478 B2 * | 5/2005 | Gardner | H02J 3/14 307/11 |
| 7,040,544 B2 | 5/2006 | Guyer | |
| 7,239,034 B2 * | 7/2007 | Gehret, Jr. | B60L 3/003 290/2 |
| 7,663,256 B2 | 2/2010 | Yuri et al. | |
| 8,056,316 B2 | 11/2011 | Poline | |
| 8,093,733 B2 * | 1/2012 | Yuri | F01K 23/065 290/2 |
| 9,606,594 B2 * | 3/2017 | Noureldin | G05B 17/02 |
| 2002/0084655 A1 * | 7/2002 | Lof | F03D 7/0284 290/44 |
| 2003/0213246 A1 | 11/2003 | Coll et al. | |
| 2004/0267408 A1 * | 12/2004 | Kramer | H02J 3/00 700/291 |
| 2006/0053791 A1 * | 3/2006 | Prentice, III | F23G 5/006 60/645 |
| 2006/0201148 A1 * | 9/2006 | Zabtcioglu | F01K 17/02 60/508 |
| 2009/0008089 A1 * | 1/2009 | Zubrin | E21B 41/0064 166/250.15 |
| 2009/0206600 A1 * | 8/2009 | Horie | F01K 13/02 290/2 |
| 2012/0010758 A1 * | 1/2012 | Francino | G05B 17/02 700/291 |
| 2012/0029711 A1 | 2/2012 | Besore et al. | |
| 2012/0126537 A1 * | 5/2012 | Takita | F02B 63/04 290/2 |
| 2013/0245845 A1 * | 9/2013 | Noureldin | G05B 17/02 700/287 |

OTHER PUBLICATIONS

International Preliminary Report on Patentability and Written Opinion of the International Searching Authority of PCT/US2013/045232, dated Sep. 26, 2013.

* cited by examiner

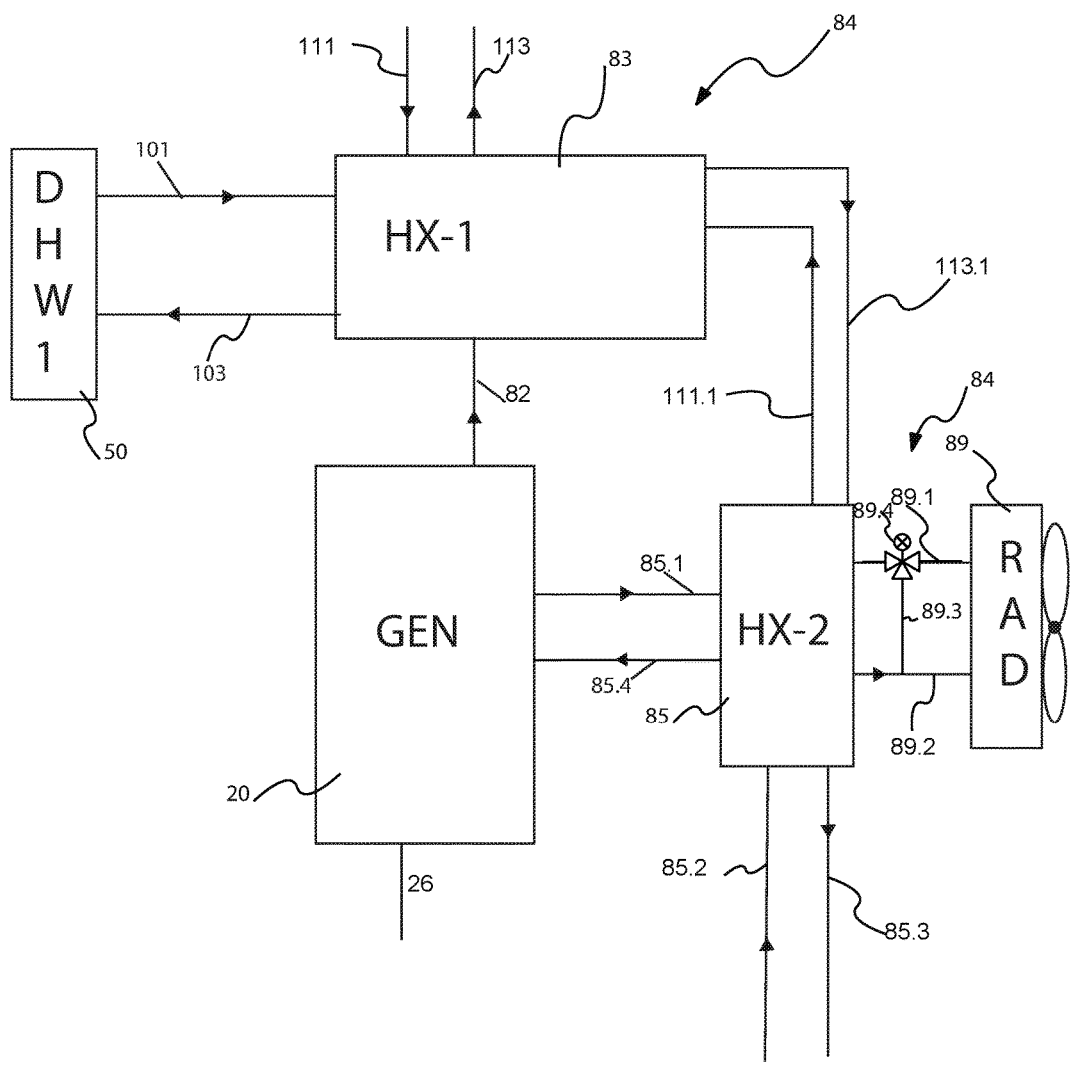

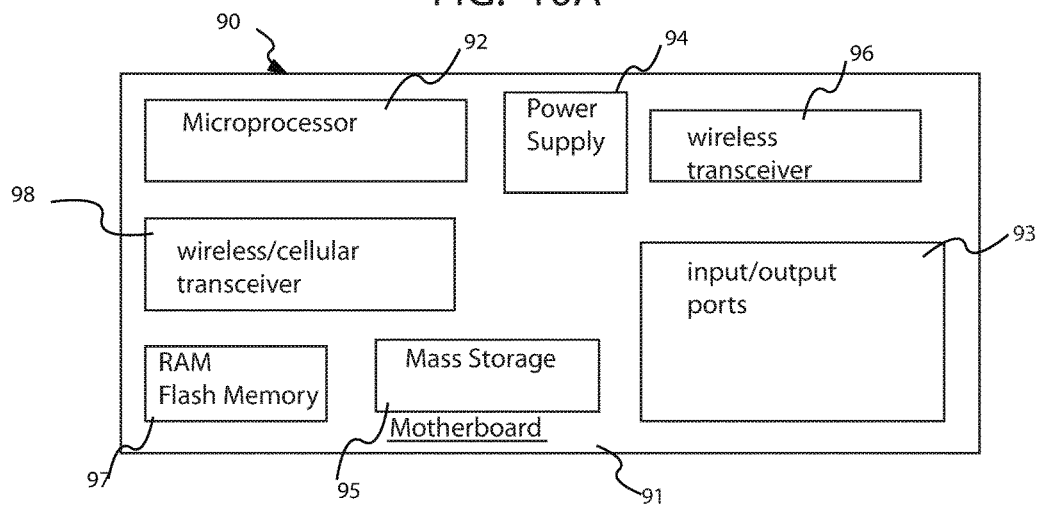
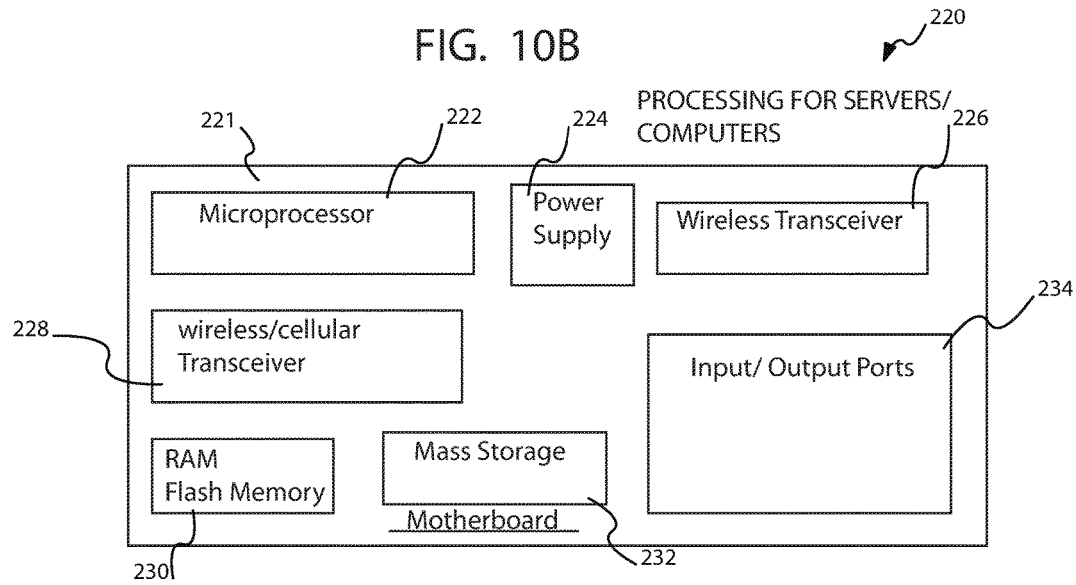

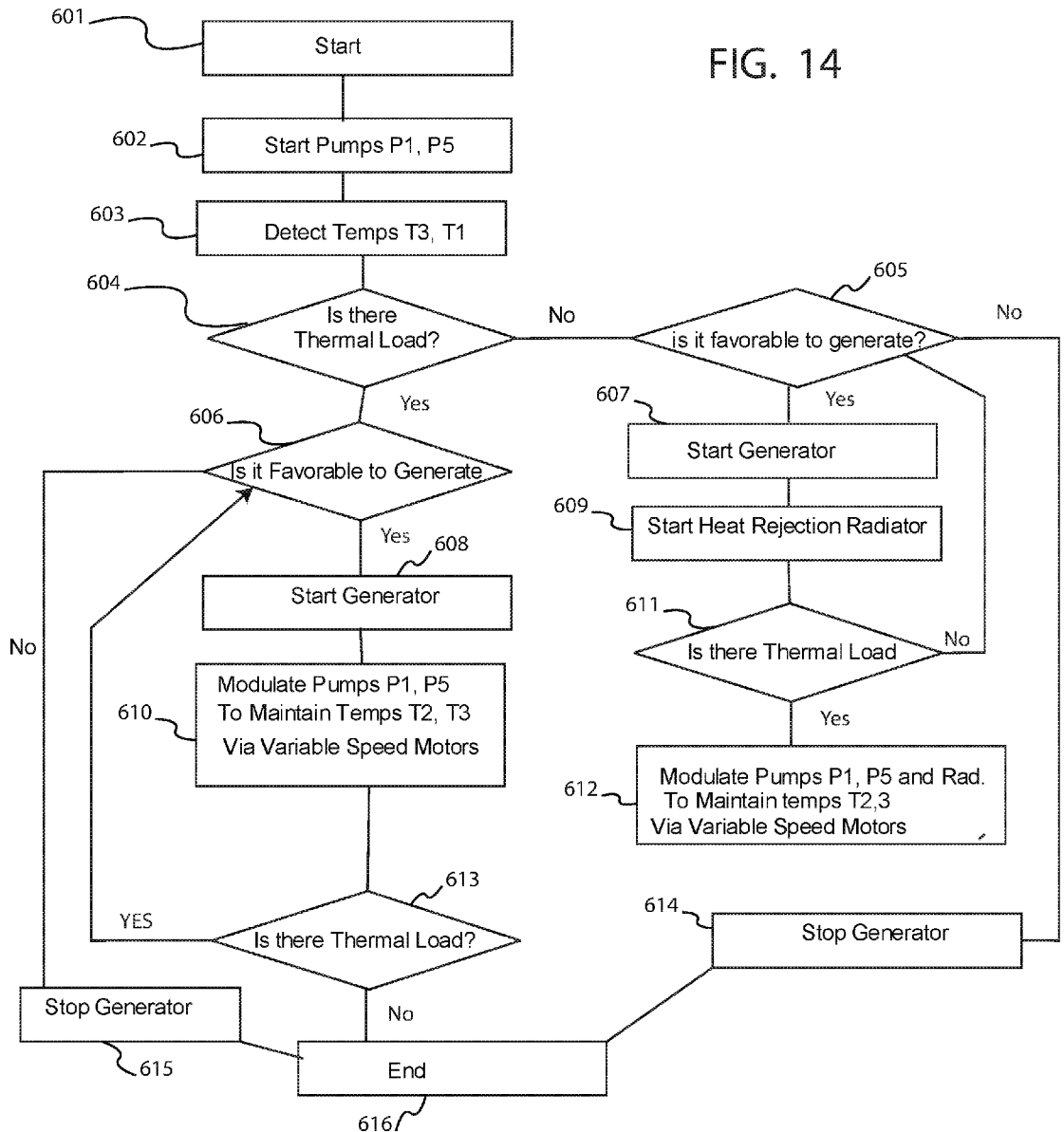

COGENERATION SYSTEM CONFIGURED TO BE INSTALLED INTO AN EXISTING BOILER PLANT/EMERGENCY GENERATOR INSTALLATION AND PROCESS FOR COGENERATION

CROSS REFERENCE TO RELATED APPLICATIONS

This application is a Continuation in Part Application of U.S. application Ser. No. 13/684,276 (hereinafter the '276 application) filed on Nov. 23, 2012 now issued as U.S. Pat. No. 9,285,847 on Mar. 15, 2016, wherein the '276 application is a non-provisional application of provisional application Ser. No. 61/659,633 filed on Jun. 14, 2012, now expired the disclosure of both of these applications are hereby incorporated herein by reference in their entirety.

BACKGROUND OF THE INVENTION

At least one embodiment of the invention relates to a co-generation system that includes a generation unit comprising a generator, comprising an internal combustion engine configured to drive the generator to create power. This co-generation system is also configured to provide heat as well.

Traditionally, heating and ventilating systems were kept separate from generators. For example, a typical house or building would have a hot water heater, a boiler, and electrical panel that is configured to receive power from an external power station. Some buildings would also be equipped with a generator. The generator would be separately connected to the electrical panel of the building. However the generator would traditionally not be connected to a hot water heater or a boiler, and heat associated with a generator was not used with a heating system of a house or building.

Therefore, there is a need for an efficient and simplified heating and generating system which generates both heat for a building such as a house or an office, as well as generating electricity.

SUMMARY OF THE INVENTION

At least one embodiment of the invention relates to a cogeneration system configured to be coupled to an electrical input of a building and configured to be coupled to a heating system of a building. The cogeneration system can comprise a generator configured to generate electrical energy. In at least one embodiment, the generator comprises a body 21a and an engine at least partially enclosed within the body. There can be also a fluid output and a fluid input that passes through the generator and is configured to absorb heat from the generator. There can also be an electrical output configured to be coupled to the electrical input of the building wherein when the generator is operational, the engine creates both heat and electricity. There can also be a processor in communication with the generator, the processor configured to control when the generator turns on and off based upon the amount of heat needed, the cost of fuel and the existing electrical rates. The invention is particularly suited for retrofit of existing emergency generators into existing boiler systems but the application is also well suited to new building electrical/heating systems in new or existing buildings. The benefits to existing buildings are that the majority of the infrastructure is present and only needs to be mechanically and electrically integrated and controlled by real time use of fuel and electric rates for a particular building. The real time energy rates are most effective when updates are configured to reflect changes in energy costs as they change. Additionally, external inputs such as, but not limited to, brown out protection, demand limiting and electric grid protection can be integrated into the operation of the generator boiler system.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 7 is a close up view of a heating and cooling section the co-generation system;

FIG. 10A is a block diagram of the processing system for the controller for the co-generation system;

FIG. 10B is a block diagram of the processing system representative of the computers;

FIG. 14 is a flow chart for the process for determining whether to use a co-generation system vs. a traditional heating/electrical system;

DETAILED DESCRIPTION OF PREFERRED EMBODIMENTS

At least one embodiment of the invention relates to a system for controlling at least two different devices for creating heat and/or electrical power. In at least one embodiment, there is a generator configured to provide both heat and power. That generator can have a controller for controlling whether the generator is turned on or off depending on information that is used by an algorithm being analyzed by the controller.

Figure 1A:
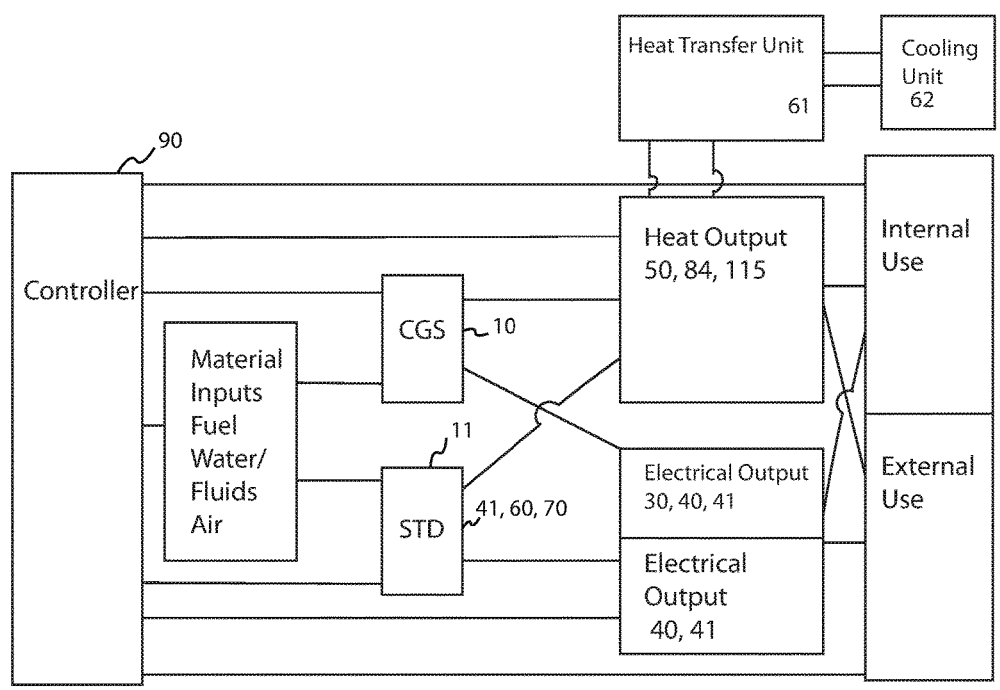
FIG. 1A is a block diagram of a co-generation system.

FIG. 1A is as block diagram indicating some of the different features or embodiments of the invention. For example, there is a controller 90 which is configured to control a co-generation system (CGS) 10 and to switch between a co-generation system and a standard (STD) electrical and heating system 11 which can include any one of a utility connection 41 to an electrical box 40 and boilers 60 and 70. The co-generation system 10 and/or the standard system STD 11 can be selected via controller 90 to provide both heat output 50, 84, 115 and/or electrical output 30, 40, 41 for internal use or for external use. An example of internal use would be use on a building such as a residence or a commercial building such as an office building, plant or retail space. More particular examples of these systems are explained in greater detail in FIGS. 4-8B below. In addition there is also a heat transfer unit 61 coupled to the heat output unit 50, 84, 115. Coupled to the output of the heat transfer unit 61 is a cooling unit or chiller 62. Thus, rather than exporting heat from the generator, the heat generated from the generator is sent to the heat transfer unit 61, which then sends the transferred chilled water to a chiller 62. Electrical box 40 can include an electrical meter. This cogeneration system is configured to provide power through the inverter to the electrical box so that the cogeneration system can pass this power on to an electrical utility. If the cogeneration system passes this power on to the cogeneration system, then the electrical meter is configured to record this passing of power to the utility. With this design, and with at least one style electrical meter, this meter is configured to spin forwards if the building is receiving power and spin backwards if it is providing power to the utility. Alternatively, electronic or computerized meters can be installed which simply record the net inflow or outflow of power into a building site.

Figure 1B:
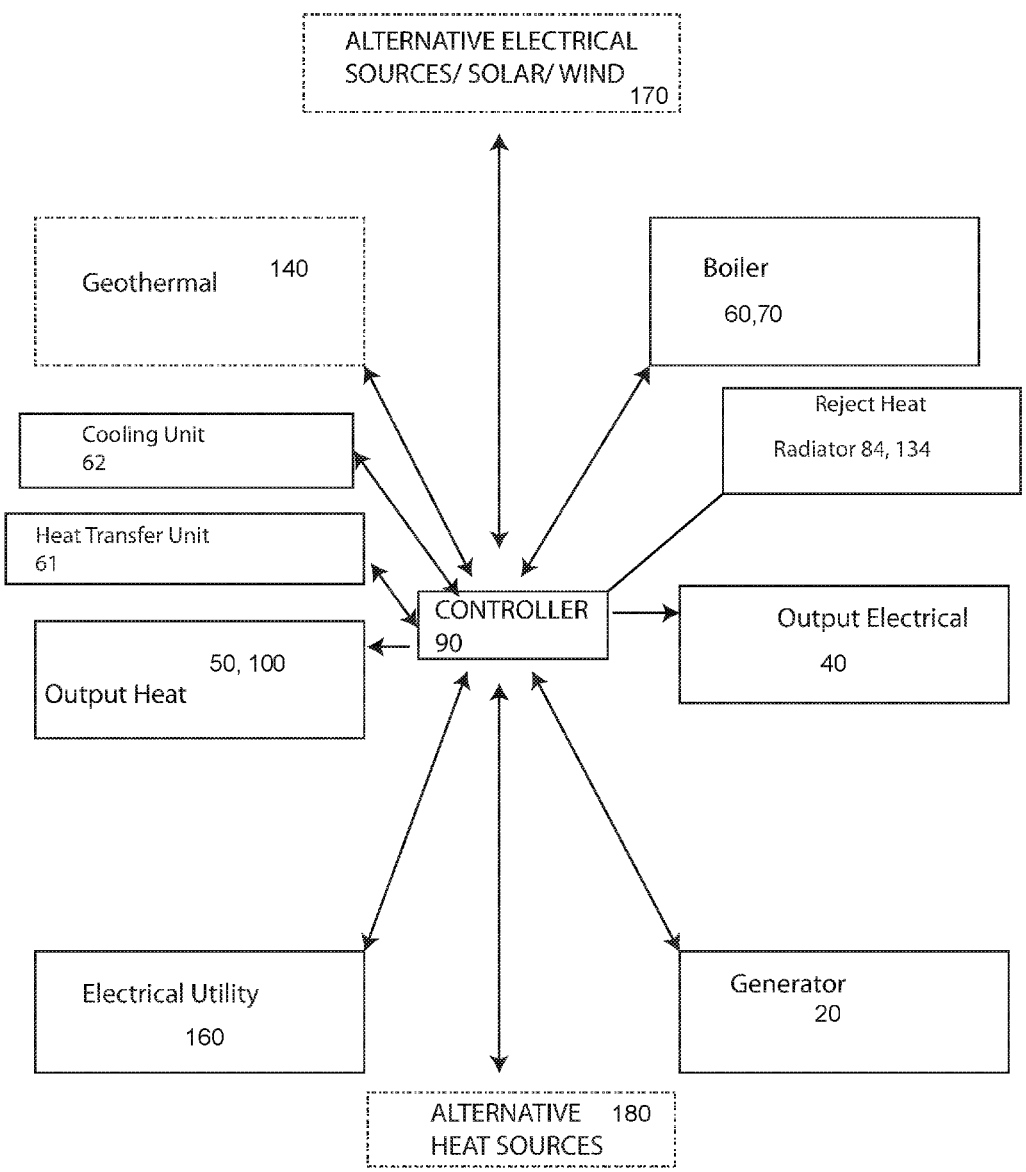
FIG. 1B is a layout of the components controlled by the controller.

FIG. 1B is a block diagram of the different components of a co-generation system 10 or a standard generation system 11 that are controlled, or at least monitored by a controller such as controller 90. Controller 90 and/or controller 220 can be configured to control a generator 20 for a cogeneration system 10. Generator 20 is configured to provide both heat and electrical power, as is discussed further below. Controller 90 and/or controller 220 is in communication with, and/or can be configured to control a number of other heating or cooling systems as well as electrical systems. For example, controller 90 can be in communication with any one of a boiler such as any one of boilers 60 and 70; a radiator system 84; a heat output system 50, 100; an electrical output system 40; an optional geothermal source 140; an electrical utility 160; alternative electrical sources such as solar/wind etc. 170; or alternative heat sources 180. The connections, and information passed between these systems, and the level of control between these systems is explained by way of example below. Controller 90 is configured to control heat transfer unit 61 as well as cooler 62. Thus, controller 90 can control heat transfer unit 61 and cooler 62 to turn on heat transfer unit 61 and chiller 62 when there is a condition that would result in a savings for using the heat transfer unit 61 and chiller 62.

Figure 2:
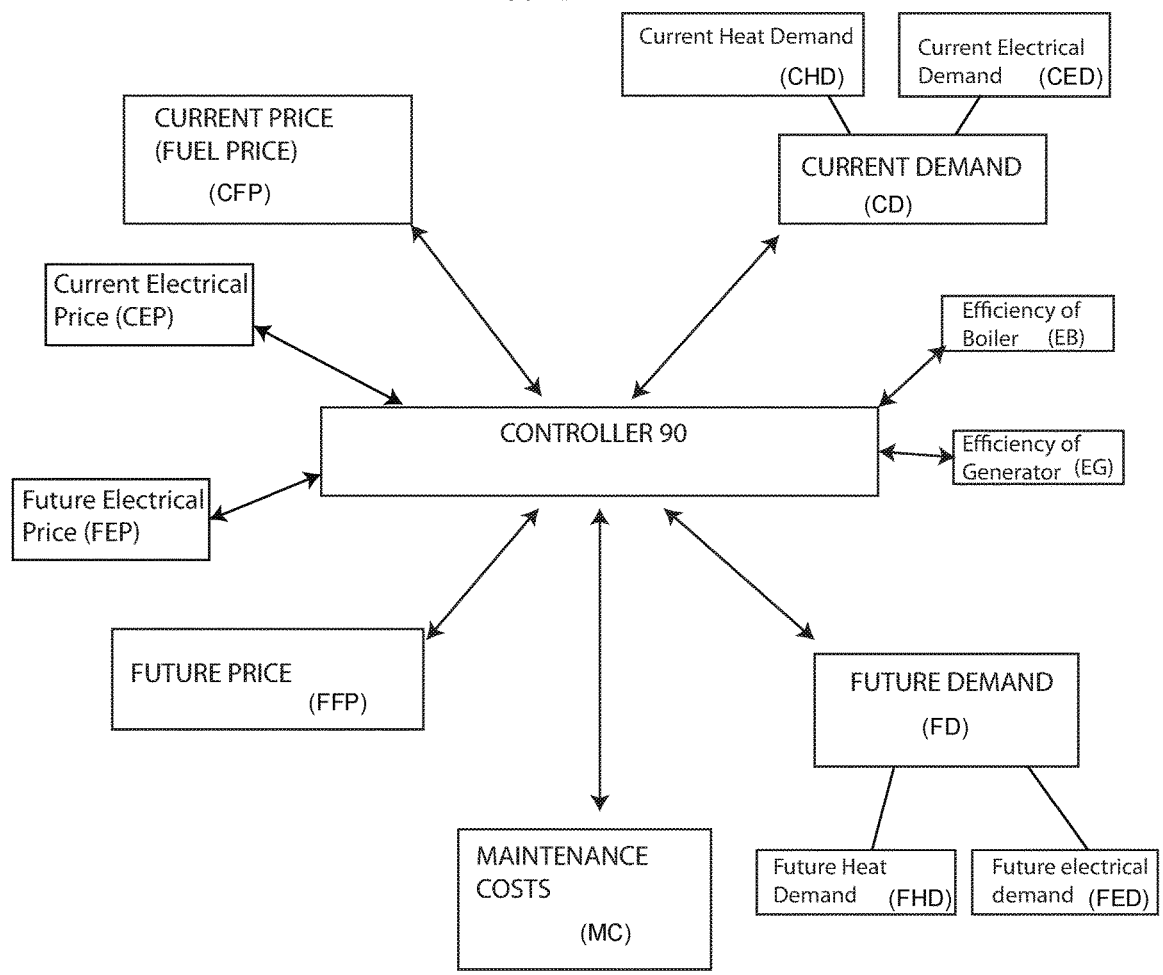
FIG. 2 is a block diagram indicating the different types of information processed by a controller for a co-generation system.

For controller 90 and/or 220 to control the different components listed above, it is configured to evaluate the different components based upon different sets of information fed to controller 90. FIG. 2 is a block diagram indicating the types of information evaluated by controller 90. For example, in determining whether to run a co-generation system, controller 90 evaluates the following different types of information fed to controller which include: the current fuel price (CFP); (which can be (FU, FD, FDC (see below) the current electrical price (CEP), (which can be (KW, KWH, KWD see below) the current demand (CD) such as the current heat demand (CHD) or the current electrical demand (CED); the future fuel price (FFP), the future electrical price (FEP) the maintenance costs (MC) as well as the future demand (FD) including the future heat demand (FHD) and the future electrical demand (FED). Additional information that can be obtained includes the efficiency of the generator in producing heat (EG), and the efficiency of the boiler in producing heat (EB). The maintenance costs, (MC) for both the boiler (BMC) and the generator (GMC) can be determined either internally by the sole running of the generator, or externally by the publishing of maintenance cost schedules for standard units for either the generator or the boiler. For example the current fuel price can be formed from the fuel usage price FU; the fuel demand charge (FD) and a fuel distribution charge (FDC) over time. FU is the price a fuel distribution company charges based upon the amount of fuel delivered or provided to a building. FD may be a peak charge for providing fuel during peak hours. FDC is the charge that a fuel company may provide for delivering this fuel. This cost may be a fixed charge on an invoice or a bill from a fuel provider such as a gas provider or an oil provider. In addition, the cost for the current electrical price CEP can be calculated by the following factors (KW) which is the electrical demand charge; (KWH) which is the electrical cost for usage and (KWD) which is the electrical cost for distribution charge. KW is a charge that is instituted during peak hours and is used to charge a premium for users using electric service during this time. This premium may not be charged until a minimum amount of energy is used over a period of time during peak times. KWH is the charge provided by a utility for the actual usage of electrical power per kilowatt; KWD is the charge an electrical company charges for delivering power to a building. This charge is usually a fixed charge.

Figure 3:
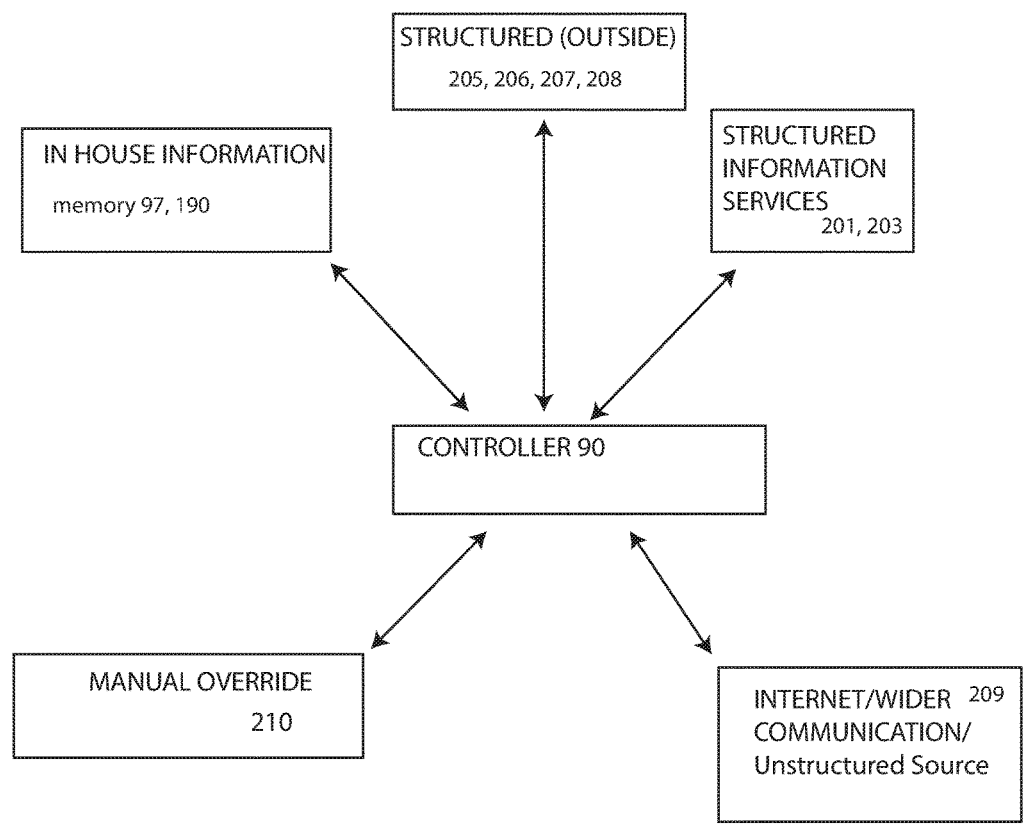
FIG. 3 is a block diagram indicating the types of resources or information providers for the information shown in FIG. 2.

For example, this information can then be downloaded by the controller and stored in memory to be used in the cost calculations. Similarly, the efficiency gradients or ratios for the generator or the boiler can also be recorded internally for the individual generator(s) or boiler(s) or downloaded from external sources. The internal recordings result from the history of the individual machine and its cost schedule for meeting an associated thermal demand. This information can be used to determine whether to turn a cogeneration system on or off and can be used with formulas which are shown by way of example in FIGS. 15A and 15B, 17 and 18. The external information providers discussed above relating to maintenance costs and efficiency gradients or coefficients can be obtained by the outside information providers FIG. 3 is a block diagram of the information sources for controller 90. These information sources are configured to provide information to controller 90 through communication with the controller such as through a motherboard and/or through a computer network. These information sources can be used to provide information shown in FIG. 2. For example, controller 90 can be configured to receive information from inside sources such as from a memory 97 stored in controller 90, and from a computer 190 in communication with controller 90 but disposed on a local area network (See for example FIG. 9). In addition, controller 90 can be configured to communicate with structured information sources such as a database server 201 or an application server 203. Alternatively, controller can be configured to communicate with structured outside sources such as through a subscription to additional services. An example of these types of structured information sources are databases and information providers associated with electrical utilities 205, gas or fuel utilities 206, Regional markets 207, or any other type of structured information source 208. The information from these structured sources can be in the form of a contracted for set of information, a subscription, or any other type of communication for information which can be pushed or pulled across a computer network Alternatively, controller 90 can be configured to receive information from the wider internet 209, from any unstructured source of information. This could be general websites that could provide information via a subscription, via scraping this information off of the site or any other suitable form of transfer of information.

Alternatively, there is a manual override 210 wherein the user can input information into controller 90 as well. This manual override can be provided by the user inputting information into controller 90 via a keyboard plugged into controller 90 or via a computer such as computer 190 (See FIG. 9) which is configured to input information into controller 90. Manual override 210 can also include a manual button or switch such as an emergency shut down button or switch or an emergency turn on switch as well.

Figure 4:
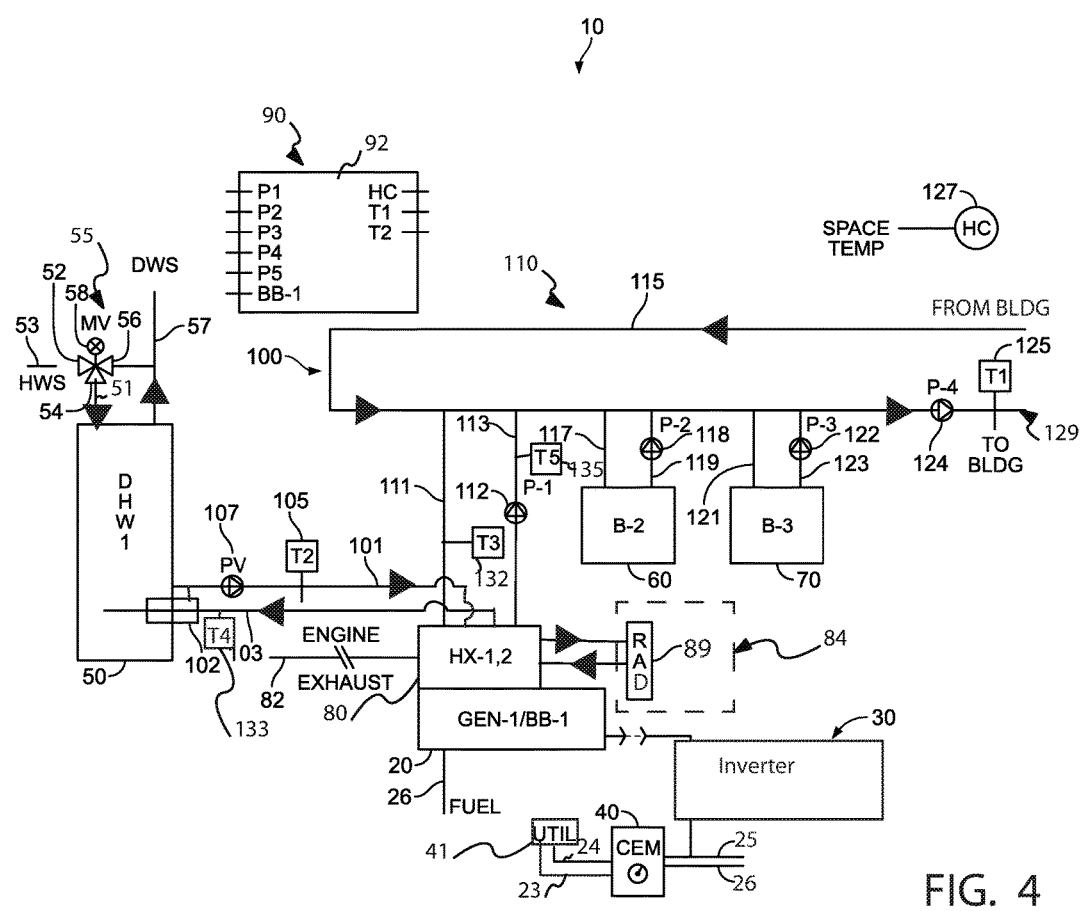
FIG. 4 is a block diagram of a first implementation of a co-generation system.

FIG. 4 shows a block diagram for the layout for a co-generation system 10 for use in conjunction with or as an alternative to a standard heating/cooling and electrical system 11 (See FIG. 1A). For example, a first embodiment of a co-generation system 10 comprises a standard generator 20 which can be in the form of a portable, or fixed generator having an engine such as an internal combustion engine which produces both heat and electricity. Generator 20 can also be considered a base boiler (BB). The generator can be configured to use any suitable type of fuel such as gasoline, propane, kerosene, natural gas, coal, diesel, biodiesel, or any other type of suitable fuel for a generator. Generator 20 which has an electrical input/output coupled to an inverter system 30. Inverter system is configured to convert the DC (direct current) output of the generator into AC (alternating current) power for the electrical box. Inverter system 30 is in series with a standard electrical box 40. Box 40 has output lines 23 and 24 to utility 41 or lines 25 and 26 into the building. These lines 23 and 24 can be phase and neutral lines while lines 25 and 26 can also be phase and neutral lines. Ground lines can be included as well. This type system can also be used with systems including ground lines and multiple phase lines as well. There is also a fuel input 26 which is configured to receive fuel from a fuel line such as a natural gas line or an oil or gas line as well. Generator 20 can be configured as a generator comprising an internal combustion engine. While an internal combustion engine running on fuel is one example, other types of electrical generators which generate heat as a result of the energy generation can also be used as well.

Coupled to this generator are a plurality of heating or similar types of components such as a domestic hot water heater 50, as well as one or more boilers 60 and 70 as well. Coupled between this generator, 20 and the rest of the system is a heat absorption system 80 which comprises one or more, or at least one heat exchanger as well. This heat absorption system 80 is shown in greater detail in FIG. 7 which shows at least one, or as an example two heat exchangers 83, and 85 coupled to an output of generator 20. Heat absorption system 80 is configured to take the heat from generator 20 and pass this heat into the system and onto any one of hot water heater 50 or into manifold 110 or to selectively expel this heat from the system. For example, heat absorption system 80 can be configured to absorb cooling system heat, from a system used to cool the operating temperature of the generator 20, exhaust system heat, taken from the exhaust generated by the combustion of fuel or other materials; and any additional heat such as radiant heat expelled by generator 20. Thus, heat absorption system 80 includes both heat exchangers 83, 85, and 87 (See FIG. 6) as well as a radiant heat expiration element 84 and also includes an exhaust 82 as well. These heat exchangers 83, 85 can be in the form of a liquid cooled or air cooled system which then passes the heat from this generator 20 into fluid passed along the manifold system. In at least one embodiment, this fluid comprises water.

As described above, controller 90 is configured to determine how this energy is passed or fed into the system and also determines whether the generator turns on or off based upon at least one algorithm presented below. In addition, controller 90 is in communication with a plurality of components associated with a manifold system 100 which interconnects these heating and cooling devices together. Controller 90 comprises at least one microprocessor 92 which is configured to control the processing necessary to determine whether to turn on or off the generator. Controller 90 is in direct communication with generator 20 as well as boilers 60 and 70 to control the operation of these devices. The configuration of this controller is explained in greater detail in FIG. 10A.

Generator 20 is coupled to a manifold system 100. Manifold system 100 can comprise a first set of fluid conduits which can comprise in at least one embodiment, conduits such as pipes that are used to convey fluid such as air, a liquid such as water, or any suitable fluid to the different heating units 50, 60, and 70. A plurality of valves are positioned along, or in line with these conduits as well. At least some or all of these valves are in communication with controller 90 and can be controlled by controller 90 as well to selectively allow fluid to flow between the cooling system/heat exchanger 80 and the rest of the system. For example, a first set of pipes or conduits 101 and 103 are coupled to heat exchanger 80, with pipe 101 configured for fluid flow to domestic hot water heater device 50, while pipe 103 is configured as a fluid return. Valve 102 is coupled to both pipes 101 and 103 and selectively controls the inflow and outflow of water into the system. Valve 102 is in the form of a mixing valve and controls both the inflow and outflow of water at a single point of entry into the system.

Domestic hot water heater 50 also includes inputs and outputs comprising an input pipe 51 which inputs water from a utility, an outflow pipe 57 as well, which allows water to flow out from this hot water heater as well. There are also a plurality of valves 52, 54, 56 which control the outflow of water into the hot water heater as well as control the flow of water to the rest of the house or building as well. These valves 52, 54, 56 can be selectively controlled by controller 90 which is in communication with control dial 58.

Manifold system 100 can also include a plurality of conduits 110 which are associated with providing communication between generator 20, boilers 60 and 70 and DHW 50, as well as communication with the remainder of the home or building. This manifold system 100 can also include any associated valves, pumps and temperature sensors. Boilers 60 and 70 can be coupled together in fluid communication with each other, and with generator and heat exchanger/cooling system 80 via conduits 110. A first conduit 111 is a return pipe, while a second conduit 113 is an outflow pipe from heat exchangers 80. A valve 112 is coupled along pipe 113 which controls the flow out from heat exchangers 80. A water conduit based manifold element comprising a piping system 115 is fluidly coupled to pipes 111 and 113. This set of pipes provides return fluid from a building. Alternatively pipe 129 is configured to pass water into the building for heating or cooling of the building. In addition, boiler 60 is coupled to conduit 110 via pipes 117 and 119 as well with valve 118 disposed along pipe 119. These pipes, lines or conduits provide the outward flow as well as the return path of fluid into the boiler. When valve 118 is closed, fluid cannot flow into boiler 60 thereby isolating this boiler. This valve can be either manually controlled or controlled by controller 90 via communication from controller 90.

In addition, boiler 70 is coupled to piping system via pipes 121 and 123 as well. A valve 122 is coupled along pipe 123. Valves 118 and 122 are configured to control the flow of fluid such as water into boilers 60 and 70 respectively. Valve 112 is also configured to control the flow of water into and out of heat exchanger/cooling system 80 as well. Another valve 124 is coupled along piping system 129 and is configured to control the fluid flow along these pipes as well. All of these valves can be controlled either manually or be configured to be in communication with controller 90 such that controller can selectively open and close these valves to selectively isolate or open up portions of the manifold for operation. For example, if boiler 70 was to be selectively taken off line, valve 122 could be closed by controller 90 thereby isolating fluid flow from boiler 70. Fluid would simply pass to boiler 60 and/or heat exchanger(s) 80 associated with generator 20. Alternatively, if controller 90 selectively opened valve 122 boiler 70 would receive the fluid flow, and be in line to provide heat to the fluid in the conduit. Essentially generator 20 with associated heat exchanger(s) 80 is coupled in parallel with additional boilers 60 and 70 along a conduit such that additional boilers can be brought on line via a signal or instruction from controller 90.

Valves 107, and 124 can be used to selectively isolate components disposed along the manifold. For example, valve 107 can be selectively used to isolate the domestic hot water heater 50 from the heating system comprising the generator 20 or the boilers 60 and 70. Alternatively, the heating and cooling system for the building can be isolated from the heating system comprising the generator 20 and the boilers 60 and 70 via valve 124. Both of these valves are configured to be controlled either manually or electronically such as via controller 90.

Temperature sensors are coupled along the pipes as well. These temperature sensors are configured to be in communication with controller 90. These temperature sensors include temperature sensor 105 configured to read temperature T2, which is the temperature of water leaving DHW 50, temperature sensor 125 configured to read temperature T1 which is the temperature of water flowing through the heating system for a building, and space temperature sensor 127 (HC) configured to read the ambient temperature in a building temperature sensor 132 configured to read temperature T3 which is the temperature of water flowing into generator 20, temperature sensor 135 configured to read temperature T5 which is the temperature of the water leaving generator 20, and temperature sensor 133 configured to read temperature T4 which is the temperature of water flowing into DHW 50. Depending on the readings of the temperature sensors by controller 90, controller 90 can selectively activate generator 20, boiler 60 and/or boiler 70. In addition, if the heat generated by generator 20 and heat exchanger(s) 80 is too high, it can be expelled via a radiator system 84 which includes a radiator 89 configured to selectively eject heat from heat exchanger(s) 80. This radiator system 84 is shown in greater detail in FIG. 7.

Figure 5:
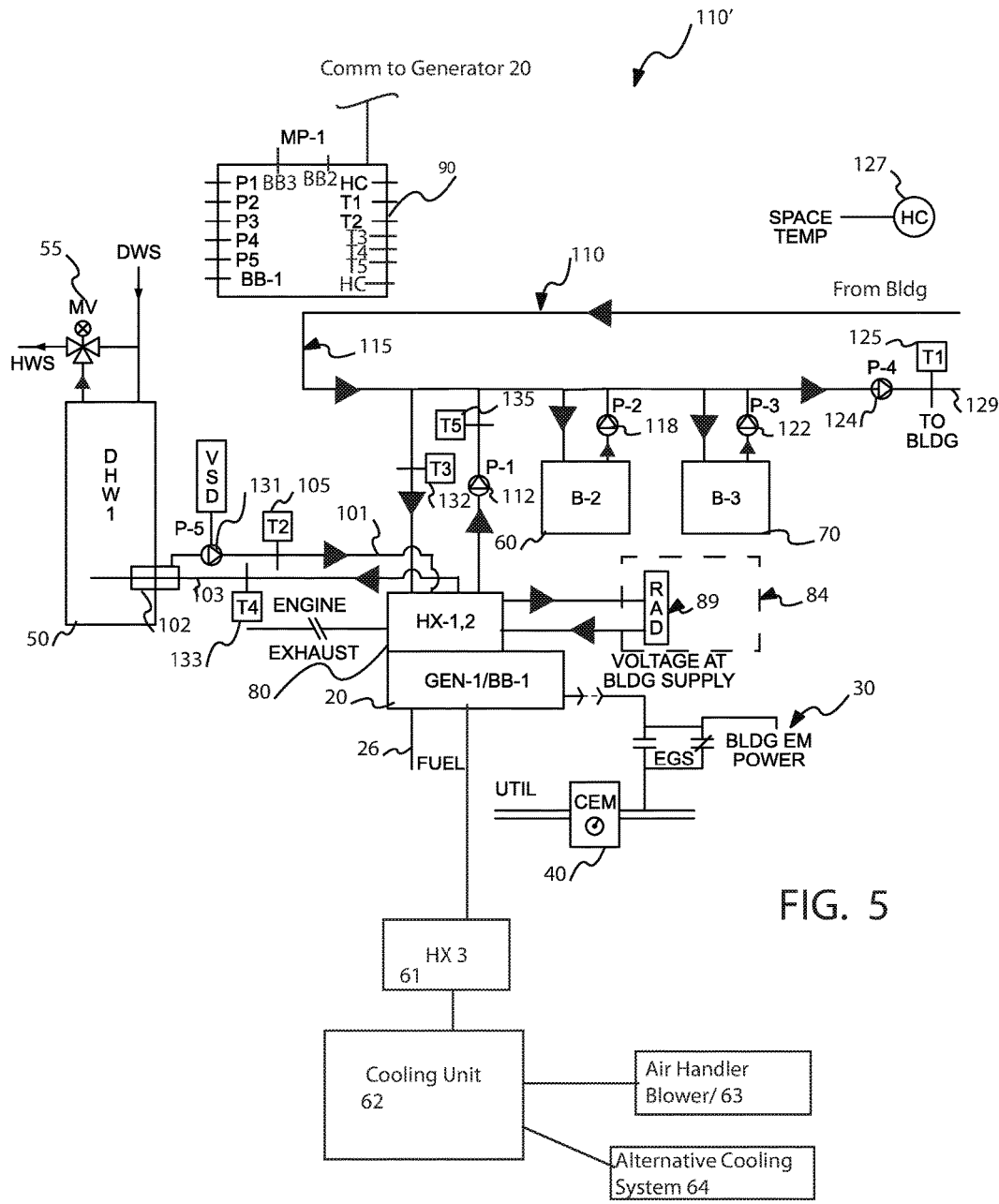
FIG. 5 is a block diagram of another implementation of a co-generation system.

FIG. 5 is an alternative embodiment 110' for a co-generation system. For example, there is shown a piping and manifold system 110 which connects the generator 20 and heat exchanger(s) 80 with boilers 60 and 70. In addition, there are also pipes or conduits that connect the generator/heat exchangers 80 with the domestic hot water heater 50 as well. Disposed along these conduits or manifolds are valves and temperature sensors as well. However, this embodiment includes an alternative configuration of valves and temperature sensors.

For example, this embodiment includes a variable speed drive pump 131 also known as pump p-5 which is coupled along line 101 and is configured to provide variable fluid flow between hot water heater 50 and the combination of the heat exchanger(s) 80 and generator 20. Along with variable speed drive 131, there are additional temperature sensors installed along the manifold or piping system as well. For example, there is temperature sensor 132 which provides a reading for a temperature T3, temperature sensor 133 which provides a reading for a temperature T4 and temperature sensor 135 which provides a reading for a a temperature T5.

For example, temperature sensor 105 providing temperature T2 is configured to determine the temperature of the water in the domestic hot water heater 50. Temperature sensor 133 providing temperature T4 is configured to determine the temperature of the water coming from the heat exchanger(s) 80. If controller 90 determines that a temperature of temperature sensor 105 providing temperature T2 is below a predetermined amount, then controller 90 can open valve 102 and turn on variable speed drive (VSD) or pump 131 when controller 90 finds that temperature sensor 133 reads that temperature T4 is above the predetermined amount or value. Then, the water coming from heat exchanger(s) 80 would drive the temperature of domestic hot water heater 50 above the predetermined temperature (PT). A thermal demand (TD) can be determined based upon the difference between the predetermined temperature PT and the temperature T2 at sensor 105. If the temperature T2 is outside of the predetermined range for temperature PT then there would be a thermal demand. Another way to calculate thermal demand would be to determine the temperature at sensor HC associated with a thermostat and to compare it to the preset or predetermined temperature for the thermostat.

The total thermal demand for the hot water heater can be the difference between the predetermined temperature PT and the temperature at T2 multiplied by the volume of the water in water heater 50 shown as follows:

$$\text{Total Thermal Demand} @DHW1 \text{ or } 50 = (PT - T2) * (\text{Volume of Water in } DHW1\ 50) * K$$

Wherein K1 is a constant for raising the temperature of the volume of water one degree.

The amount of heat necessary to be inserted into the system, and therefore the amount of heat necessary to be generated by generator 20 in response to a call for thermal demand to drive the temperature above PT can be monitored by temperature sensor 133 which measures a temperature T4. To calculate the amount of heat at a given period of time being inserted into domestic hot water heater (DHW) 50 is based upon the thermal load of the system. This can be calculated by the difference in temperature at temperature sensor 133 (T4) vs. the temperature at temperature sensor 105 (T2) multiplied by the amount of water pumped by variable speed drive (VSD) 131 over a given period of time.

The control of the heating system for the building operates in a similar manner. For example, temperature sensors 125 (T1), 132 (T3), 135 (T5) and space temperature sensor 127 (HC) are configured to provide information to controller 90 to allow controller 90 to determine whether to add heat from generator 20, boiler 60 or boiler 70 to the building.

For example, if a temperature HC at temperature sensor 127 is below a predetermined temperature for the building or (PTB), then controller 90 would determine that there is a thermal demand. It would next determine how to heat the building based upon the temperature T1 of the fluid or water at temperature sensor 125, and the temperature T3 and T5 of the fluid of water at temperature sensor 132 and 135 as well. At this point, controller 90 could selectively turn on pump 112 (P1) and pump 124 (P4). Once the fluid is flowing through the manifold system 110 via these pumps, controller 90 can monitor the temperature T1 and T3 of the fluid at sensors 125 and 132 respectively. Generally the temperature T1 of the fluid at temperature sensor 125 is above the temperature reading HC at temperature sensor 127, as well as above the temperature T3 read at temperature sensor 132. The thermal load on the system is calculated based upon on the differential between the temperature T1 at sensor 125 vs. the temperature T3 at temperature sensor 132. This temperature differential in combination with the amount of fluid or water pumped through the system over a time T determines the amount of heat input into the heating of the building and consequently the thermal load (TL) on the system. A total thermal load would be a combination of the thermal load (TLHW) associated with the domestic hot water heater DHW1 50 and the thermal load associated with the heating of the building (TLB). Therefore the total thermal load (TL) is calculated as TL=TLHW+TLB. More particularly the total thermal load can be calculated as follows:

$$TL = K1*(GPM@P1)*(T4-T2) + K1*(GPM@P5)*(T5-T1).$$

Where:
TL is the total thermal load for the system;
K1 is a constant, which in at least one embodiment is 1.083
GPM is gallons per minute flowing through a particular pump;
P1 is pump 1 or pump 112
P5 is pump 5 or pump 131
T1 is the temperature at temperature sensor 125
T2 is the temperature at temperature sensor 105
T4 is the temperature at temperature sensor 133
T5 is the temperature at temperature sensor 135.
This formula is also shown in FIG. 15.

In addition, if the generator is not running and the boilers are instead running, optional temperature sensors can be placed along the input and output lines of either boiler 60 or boiler 70, and then the formula cold also be used to calculate this temperature differential along with the flow rate along either pump 118 or pump 122.

The amount of thermal load calculated by controller 90 can be used to determine whether to operate generator 20 for heating purposes, and also whether to add additional heating units such as boilers 60 and 70 to the system for additional heat. The higher the thermal load on the system, and the greater the temperature differential between the temperature measured at sensor 127 and a predetermined temperature would be used to determine whether to operate one heating unit such as generator 20 or multiple heating units such as generator 20 in combination with boilers 60 and 70.

Furthermore, temperature sensor 135 can be used to determine the temperature T5 leaving the heat exchanger(s) 80 of generator 20. If this temperature is relatively high, but it is insufficient to overcome the thermal load, then controller 90 could then determine whether to take boilers 60 and 70 on line as a supplement. Alternatively, if only one or more boilers 60 or 70 are being used to generate heat in the system and based upon the thermal load calculated by the temperature difference between T1 and T3, controller could select to operate generator 20 to provide additional heat to the system and monitor this amount of additional heat by monitoring the temperature T5 at sensor 135 as well as the flow rate through pump P1.

Controller 90 can effectively integrate or isolate any one of generator 20, boiler 60, or boiler 70 by controlling pumps 112, 118, and 122. If pump 112 is running then generator is "on line" and integrated into the system. If pump 112 is stopped, it effectively isolates generator 20 from the system. If pump 118 is operating, then boiler 60 is "on line" and is integrated into the system. If pump 118 is stopped, then this effectively isolates boiler 60. If pump 122 is operating, then boiler 70 is "on line" and is integrated into the system. If pump 122 is stopped, then boiler 70 is isolated from the system. The term isolation or isolated means that effectively fluid is substantially not flowing through the fluid coils of these systems, and therefore these systems are not at that time providing heat into the system. However the term "on line" or integrated means that the pump is pumping fluid or water through the coils of that heat provider, and at least some of the heat generated by that heat provider is input into the manifold or the system.

In addition, there is also shown an additional heat exchanger 61 which is coupled to the output of the generator 20. Therefore, the heat generated by generator 20 can be output to heat exchanger 61. Then when the heat generated by the heat exchanger is turned into cooling energy it is fed into cooler and/or chiller 62. Then the cold water or cold fluid created by the chiller or cooler 61 is then passed onto the cooling pipes in a household or building to chill a house or building. Thus, this chilled water could be sent to an air handler or blower 63 wherein a forced-air air conditioning system could make use of this chilled water, or the water could be sent to an alternative cooling system 64 for using this chilled water.

For example, in many instances heat from an external heat source or generator is used in an Absorber or heat exchanger 61 to produce cooling water, this is commonly referred to as tri-generation. This chilled water can offset cooling that is typically accomplished by a chiller such as chiller 62. The use of external pricing such as that which is used in processor 90 is used to determine optimum usage as detailed in this patent allows the offset of the Chiller electrical use credit to determine overall savings.

For example: a 10 ton air cooled chiller running at full load at electrical usage of 1.2 kwh/ton results in an hourly electrical usage 12 kwh of electrical usage and 12 KW of demand. These electrical values can easily be added to the equation in the generators favor to allow the use of the generator when no building heat is required.

Figure 6:
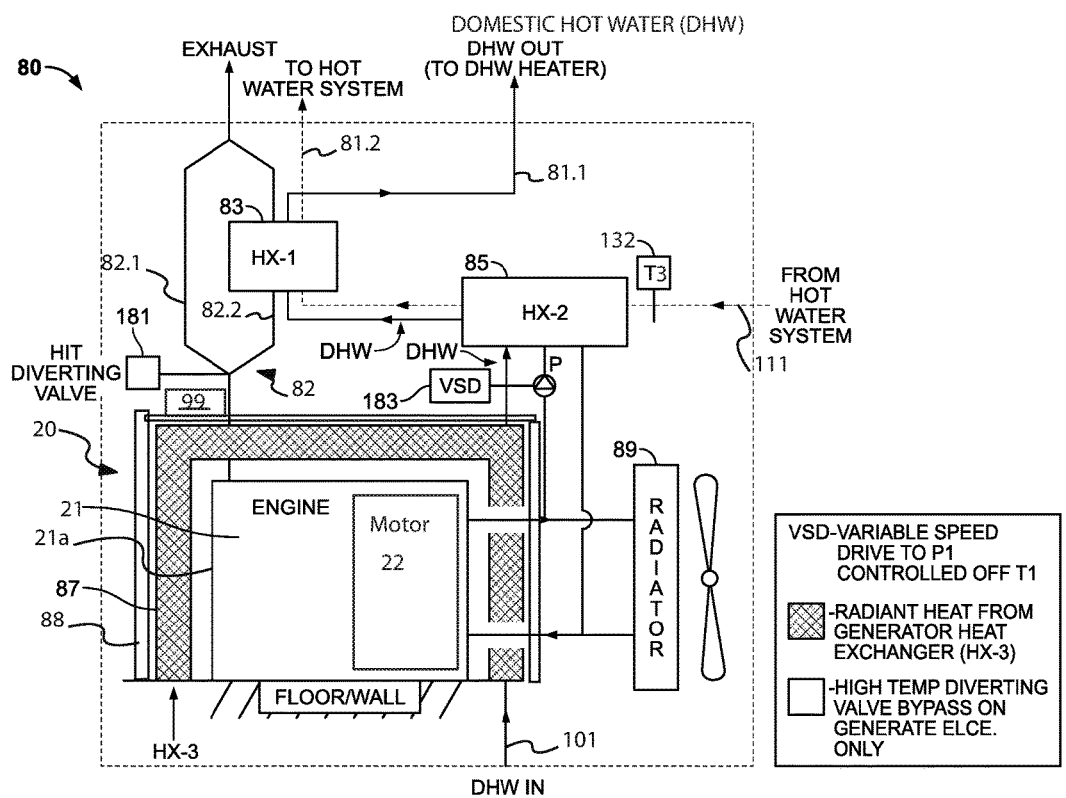
FIG. 6 is a block diagram of a close up of a co-generator.

FIG. 6 is a cross-sectional view of a generator 20 as well as a more detailed view of the heating and cooling system or heat exchanger(s) 80. For example, generator 20 includes an engine 21 and an electric motor 22 coupled to the engine. In at least one embodiment, this engine is an internal combustion engine running on fuel such as any one of: gasoline, kerosene, natural gas, diesel oil, or any other type of hydrocarbon or combustible material or chemical that is configured to generate heat. In addition other types of engines which are non-internal combustion engines can be used as well. The electric motor 22 is configured to be driven by the engine and to produce electricity when it is driven by the engine 21. Both the engine 21 and the electric motor 22 are housed in body 21a.

In at least one embodiment, this generator is a standard off the shelf generator that has been reconfigured to include at least one, alternatively, at least two or at least three heat exchangers for drawing heat from generator 20, and in particular engine 21 of generator 20.

Heat exchanger 83 (also known as HX1) is coupled in line with the exhaust of engine 21. A high temperature diverting valve 181 is coupled along line 82 and is selectively controlled by controller 90 and can be used to divert exhaust away from channel 82.2 to channel 82.1 if the heat generated by the exhaust exceeds the heat needed by heat exchanger 83. Heat exchanger 83 is configured to draw the high temperature heat from the exhaust and provide this heat into the system.

Heat exchanger 85 (also known as HX2 85) is, at least in this embodiment, coupled in series with heat exchanger 83. Heat exchanger 85 is configured to draw the heat from the cooling system of engine 21 out and to inject this heat into the system. The cooling system of engine 21 can be in the form of a liquid cooled system using coils containing liquid which are then used to draw heat away from the engine 21. Other forms of cooling systems can also be used such as an air cooled system as well. The amount of heat drawn from this cooling system can be controlled by a pump or variable speed drive 183 which can be controlled by controller 90.

A third heat exchanger 87 (also known as HX3) is configured to absorb the radiant heat provided by engine 21. This heat exchanger can be disposed inside of the jacket or housing of the generator and be configured to absorb the radiant heat generated by generator engine 21. An optional insulating jacket 88 can be disposed around heat exchanger 87 to insure that much of the heat absorbed by heat exchanger 87 is input into the system. Any one of these heat exchangers 83, 85, 87 can be used in isolation or in combination with any one or any two additional heat exchangers. In this embodiment, heat exchangers 83, 85 and 87 are coupled in series such that heat exchanger 87 is coupled in first, with heat exchanger 85 being coupled in second while heat exchanger 83 is coupled in third in order. This ensures that the lowest grade of heat which is obtained by the radiant heat of the generator is inserted into the system first; the second level of heat, which is from the cooling system is inserted second, while the highest level of heat which is taken from the exhaust is inserted third. The different grades of heat can be such that the lowest grade of heat is the heat that is provided at the lowest temperature of the different sources of heat, the heat that is the highest grade of heat is from the source the provides the highest temperature. The second level of heat can be from the heat that is between the lowest grade of heat and the highest grade of heat. Alternatively, the grade of heating could be based upon the amount of heat input into the system rather than the ranking based upon temperature. In the preferred embodiment, the order of the heat exchangers is based upon the amount of heat input into the system by each heat exchanger at each station. Thus, in at least one embodiment, the order of the heat exchangers could be third heat exchanger 87, second heat exchanger 85, and first heat exchanger 83 consecutively inputting heat into the system.

Generally, the heat generated by the radiant heat of the engine 21 is lower in temperature from the heat generated by the cooling system. The heat of both of these systems is lower than the heat of the exhaust. Therefore, with this example, the heat generated by the engine is gradually stepped up by each heat exchanger such that the heat exchanger with the highest heat levels is positioned last to create the greatest heat transfer possible.

While this order is one example, the order of these heat exchangers can be changed if it is suitable, such that the heat from the exhaust is input either first or second, or the heat from the cooling system is input either first or third or the radiant heat is input either second or third, if necessary.

For example, the order could be second heat exchanger 85, third heat exchanger 87, and first heat exchanger 83. Alternatively the order could be second heat exchanger 85, first heat exchanger 83, and then third heat exchanger 87 inputting heat into the system. Another order could be third heat exchanger 87, first heat exchanger 83, and then second heat exchanger 85. Another order could be first heat exchanger 83, second heat exchanger 85, and third heat exchanger 87. Another order for heat input could be first heat exchanger 83, third heat exchanger 87, and second heat exchanger 85. As provided above another order could be third heat exchanger 87, second heat exchanger 85 and first heat exchanger 83 as shown in FIG. 6.

As shown in FIGS. 4 and 5 a fluid such as water is cycled through this heat exchanger configuration 80, either coming from the domestic hot water heater 50 or from the hot water system including conduits 110. Thus, pipe or conduit 81.2 leads to conduit 113 while pipe or conduit 81.1 leads to pipe or conduit 103. In addition the return flow from DHW1 50 is shown being input into this system via pipe or conduit 101 and the return flow from the hot water system 111 is shown input into this heat exchanger system as well.

If the heat generated by engine 21 is too high, or if the heat generated by engine 21 is unnecessary, radiator 89 can be used to expel any excess heat from the system. This radiator can be in the form of any suitable radiator, but in at least one embodiment is a heat sink having a fan. Alternative forms of a radiator could simply be a metal cast container which emits radiant heat, or any other type of suitable heat expelling device.

In addition, as shown coupled to engine housing 88 is a controller housing or microprocessor housing 99. This controller housing or microprocessor housing 99 is configured to house controller 90 which is in communication with engine 21 and is configured to selectively turn engine 21 on or off depending on information provided to controller 90. This view FIG. 6 can be used with the systems shown in FIGS. 4 and 5 for example.

However, while this example shows a microprocessor housing 99 coupled to engine housing 88 other embodiments such as that shown in FIGS. 4 and 5 can be in the form of a microprocessor or controller system 90 which is positioned removed or unattached to engine housing 88 which can form a body for the engine.

FIG. 7 is an alternative embodiment for this heat exchanger system. This alternative embodiment shows a heat exchanger system that includes only two heat exchangers 83 and 85. These two heat exchangers are shown coupled in series. In addition radiator system 84 is shown by radiator 89 and a plurality of pipes and valves as well. For example, there is shown pipes or conduits 89.1, 89.2, and 89.3 as well as a three way diverter valve 89.4 which can be either manually controlled or controlled by a controller such as controller 90 to selectively operate or isolate radiator 89. If radiator 89 is isolated via valve 89.4 then fluid does not pass through coils or conduits of radiator 89 such that heat is not or substantially not expelled by radiator 89. Alternatively, valve 89.4 can be opened such that fluid passes through the coils or conduits of radiator 89 such that heat can be expelled by radiator 89. This selective operation of radiator 89 can be effective when generator 20 is simply being used as a generator and is not being used to inject heat into the system. Alternatively, radiator 89 can be selectively used to selectively remove a portion of the heat while still allowing heat to be inserted in to the system.

This view also shows that fluid can be inserted into heat exchanger 85 via conduits 85.1 and 85.2 forming a circulating cooling system through heat exchanger 85. The heat is then passed from heat exchanger 85 through line or conduit 111.1 to heat exchanger 83 where it is passed either into line 103 or line 113. Fluid flows back into these heat exchangers via lines 101, 111, and 111.1. Furthermore, heat exchanger 85 can obtain fluid and return fluid from a ground water source via conduits, pipes or lines 85.2 and 85.3. Generator 20 is also shown as having a fuel input line 26 as well.

Figure 8A:
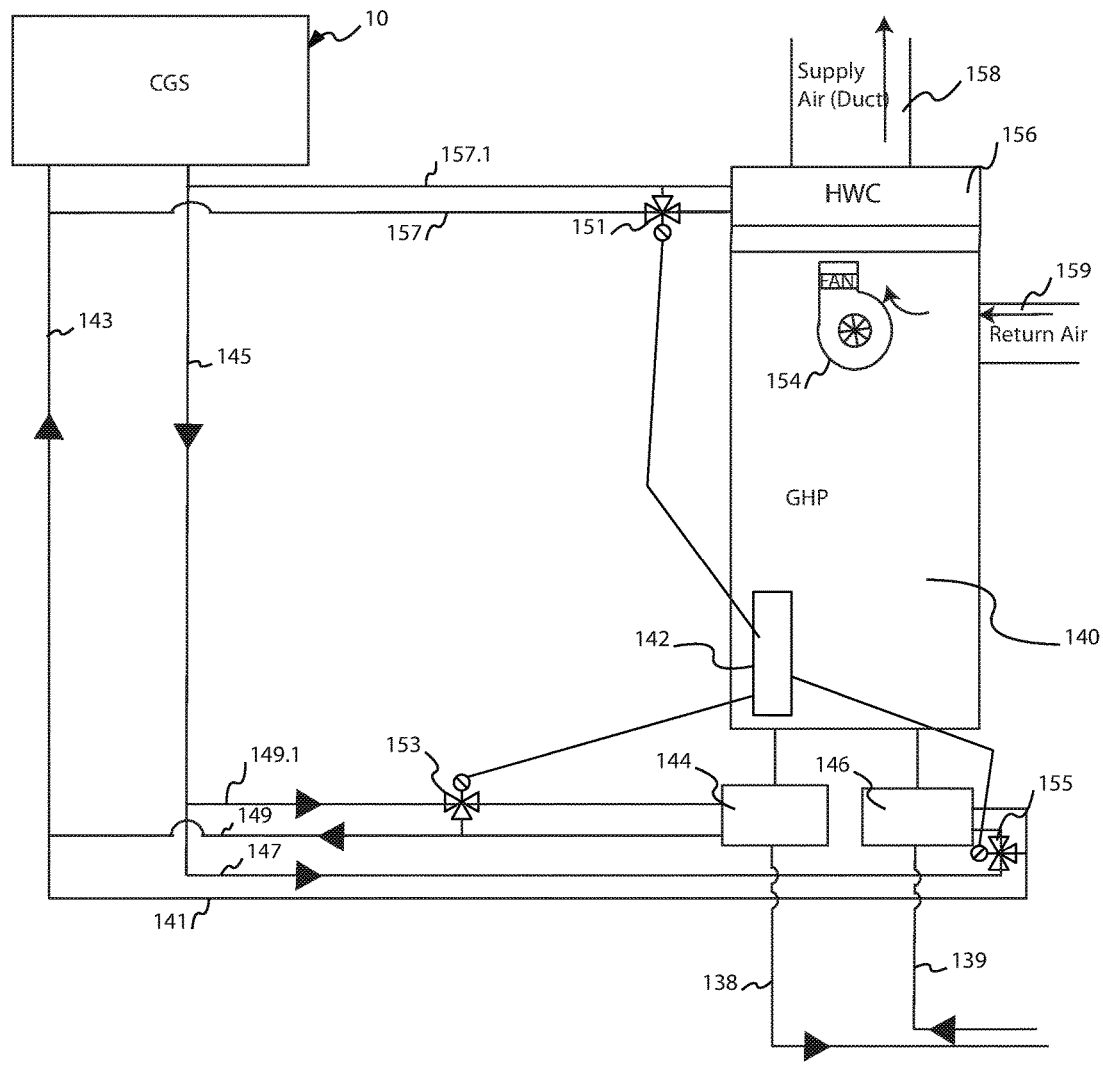
FIG. 8A is an alternative embodiment of a co-generation system having a geothermal heat pump.

FIG. 8A is a schematic block diagram of a cogeneration system 10 coupled with an additional alternative heating system such as a geothermal heat pump 140. Geothermal heat pump 140 is shown here by way of example as being a forced air heating system powered by a fan 154 which blows air past a hot water coil 156. Air flowing through vents 158 and 159 are circulated through a building such that these vents provide a supply air 158 and a return air 159. A plurality of pipes, conduits or lines 138, 139, 141, 143, 145, 147, 149, 149.1, 157 and 157.1 have arrows positioned along them to show the general flow of fluid such as a liquid such as water through the system. Valves 151, 153, and 155 are configured to selectively isolate different parts of the system and to control the fluid flow through these different parts of the system. A GHP controller 142 which can be in communication with controller 90 is configured to control valves 151, 153, and 155 via communication, either via wired lines or wirelessly. GHP controller 142 can be in the form of a microprocessor which has either an on board memory or access to, or communication with memory. Heat exchangers 144 and 146 are shown feeding into geothermal heat pump 140 to provide heat to hot water coil 156. Valve 153 is used to selectively bring heat exchanger 144 either on line or to isolate heat exchanger 144. Valve 155 which can be in the form of a three-way valve is configured to selectively bring heat exchanger 146 on line or to isolate this heat exchanger. Valve 151 is configured to provide a fluid connection between hot water coil 156 and cogeneration system 10 or to isolate this hot water coil 156 from co-generation system 10. When the GHP 140 is used for heating, heat exchanger 144 is brought on line and used for heating. When GHP 140 is used for cooling, heat exchanger 146 is brought on line instead.

This type of configuration indicates that multiple heating and cooling units may be coupled together either in series or in parallel and controlled by a controller to selectively heat a building unit.

Figure 8B:
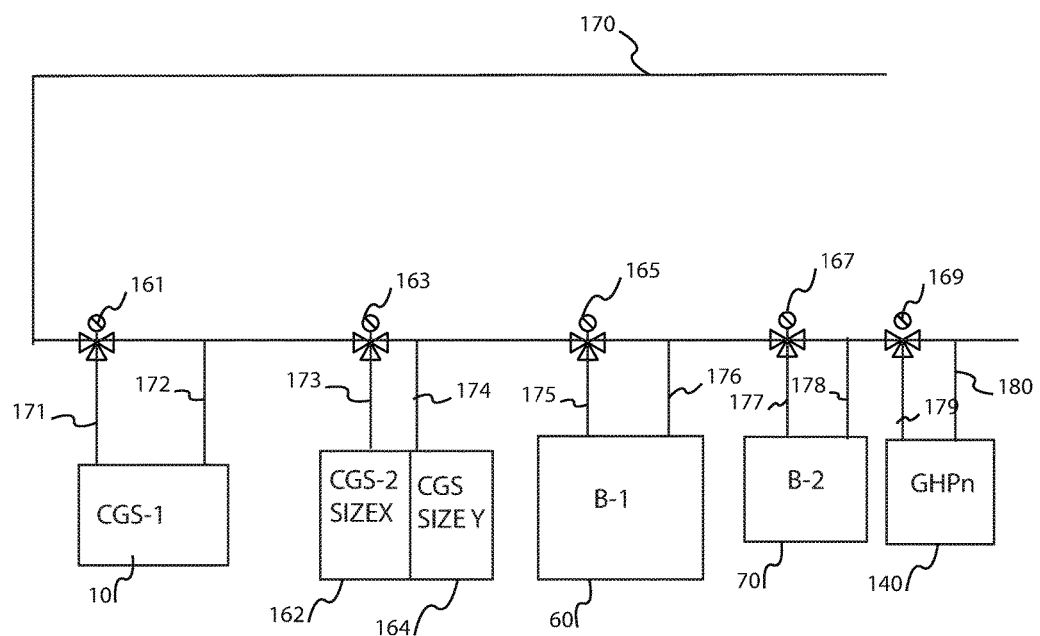
FIG. 8B is a view of a co-generation system in with multiple generating devices coupled in series or in parallel.

FIG. 8B shows a series of different heating units that can be fluidly coupled together either in series or in parallel. For example, there is shown a manifold system 170 which has a series of three way valves 161, 163, 165, 167, and 169 coupled along it. Each one of these three way valves is configured to selectively couple in a heating unit. For example, a first heating unit such as a cogeneration system 10 is shown coupled therein via lines 171, and 172. A second cogeneration system of a first size 162 or of a second size 164 can be coupled in via lines 173 and 174. A first boiler 60 can be coupled in via lines 175 and 176, while a second boiler 70 can be coupled therein via lines 177 and 178. A geothermal heat pump can be coupled therein via lines 179 and 180. Three way valves are used to selectively feed fluid through the heating unit or to selectively bypass this heating unit altogether. If the three way valves are set to force fluid only through the different heating units, then these heating units are coupled in series. If the three way valves are open to allow fluid to flow in all three directions then the heating units are coupled in parallel to each other. Alternatively the three way valve can be selectively controlled to selectively isolate individual heating units as well. While a total of five different heating and/or cooling units are shown, multiple different heating units may be included such that there can be at least one heating unit, at least two heating units, at least three heating units, at least for heating units, at least five heating units or more. In particular, in this configuration, there can be any number of different heating or generation units suitable to power and heat a building.

For the above systems to run, they are generally controlled by at least one controller such as controller 90 (See Also FIG. 1). Controller 90 can be configured to communicate with additional information providers as well such that this additional information (See FIGS. 2 and 3) can be used along with algorithms programmed into controller 90 to selectively control the components.

Figure 9:
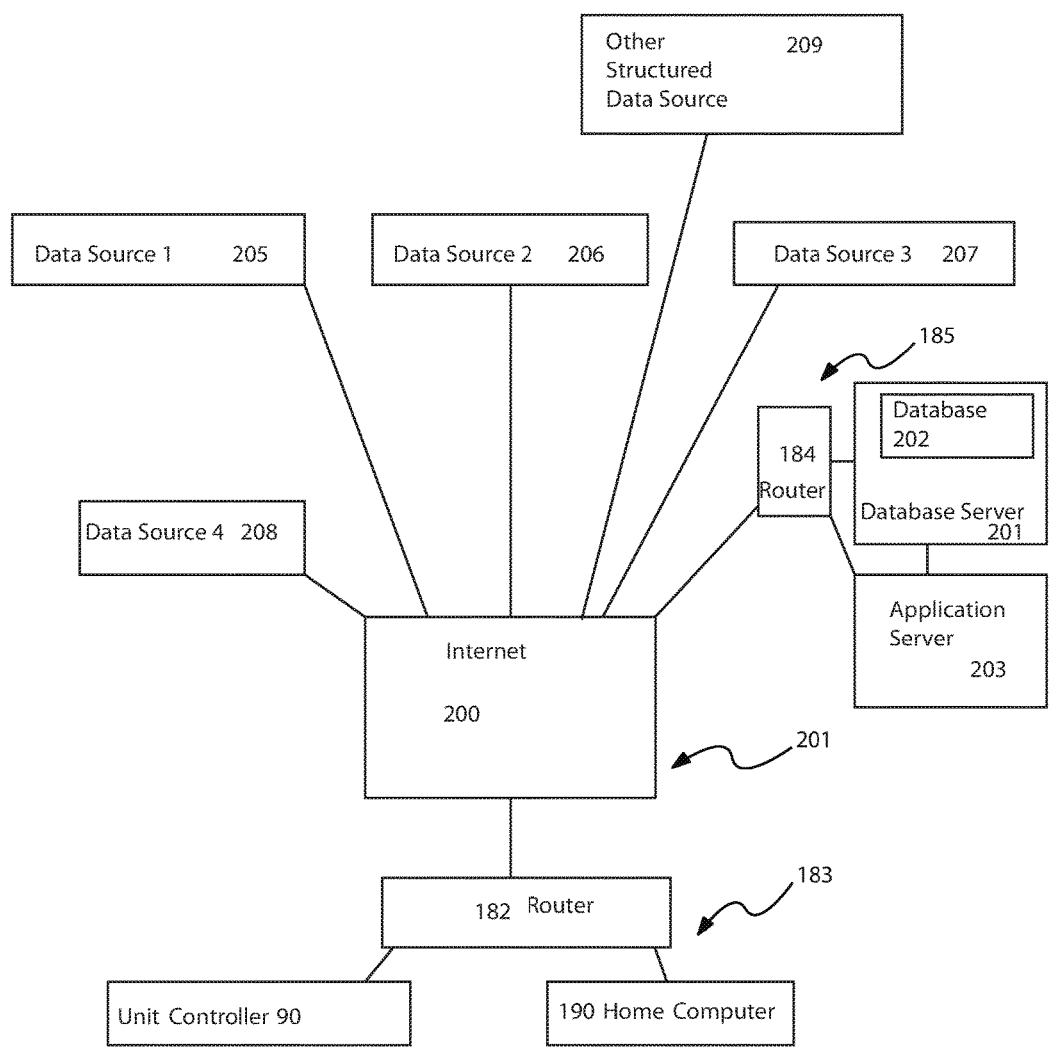
FIG. 9 is a block diagram of the computing systems for controlling the co-generation system.

FIG. 9 shows an embodiment of a computer network 201 which includes the following: controller 90, home computer 190, and router 182 forming a local area network (LAN) coupled to a wide area network (WAN) through the internet 200. A plurality of different data sources are coupled to this LAN 183 through internet connection 200. For example, there is a first data source 205, a second data source 206, a third data source 207, a fourth data source 208 and any other structured data source 209. This data source can be in the form of servers which selectively provide information to other controllers or computers such as controller 90, or computer 190 or application server 203 or database server 202. Another local area network 185 is coupled to internet 200 as well. Local area network 185 includes a router 184, an application server 203, a database server 201 and a database 202 stored on database server 201. Local area network 185 is in communication with local area network 183 and is configured to coordinate with the components of local area network 183 to control the heating and cooling system such as cogeneration system 10. While unit controller 90 or unit controller 90 in combination with home computer 190 can be configured to compile and perform calculations using algorithms, the local area network can also be used either alone or in conjunction with local area network to perform some or all of the calculations necessary to determine whether to run one or more of the heating systems associated with cogeneration system 10.

For example, data source 205 can be in the form of a structured data source such as a data feed from an electrical utility. This data feed can be in the form of existing electrical prices, existing electrical demand, future electrical prices and even past electrical prices. This information can be streamed through the network such as via a subscription service across internet 200 and be fed into a database such as database 202 in database server 201. Alternatively, this information can be stored in unit controller 90 or in home computer 190 if LAN 183 is operating alone. Data source 206 can be in the form of a second data source such as a data feed from a gas or fuel utility which indicates the price levels of fuel. These prices can be in the form of past prices for fuel, current prices for fuel or future prices for fuel. This information can be fed into database 202 in database server 201 or be fed into unit controller 90 or into home computer 190 as is necessary. A third data source 207 can be in the form of a connection to a regional energy reseller such as PJM®. This regional reseller of energy creates a floating exchange of energy rates which allow for a fluctuation of energy prices that can be bought and sold across a relatively fluid market. Generally these markets are regional affecting particular geographic areas, as energy produced in one region such as California, may not be transported over long distances to other regions such as New York. Information from this regional reseller can be used to determine both the current price for electrical energy or fuel, or future prices for electrical energy or fuel. A fourth data source 208 can be in the form of any suitable additional data source that provides energy information either openly or freely or via a subscription service. An example of a fourth data source 208 can be in the form of a data source provided by a manufacturer of a heating unit such as a generator. The manufacturer can provide information such as maintenance costs, maintenance history, operating costs, life expectancy etc., of a heating unit such as a generator. Generally, a generator has a higher operating cost and maintenance cost than another more simple heating and cooling unit such as boiler. This is because a generator includes an engine which generally involves multiple moving parts while a boiler generally includes a heating unit with minimal to no moving parts. In addition, data source 209 can be another form of an aggregator of data, in the form of a structured data source for providing information to LAN 185 or LAN 183 as well. The information provided by these computer systems and transferred over this computer network can then be input into the algorithms shown in FIGS. 11A-18 to determine whether there is heat demand, electrical demand and which heating and cooling unit to use in response to this heat or electrical demand. FIG. 10A is a schematic block diagram of the electrical components of a control unit such as control unit 90. These electrical components can include a motherboard 91, and a processor such as microprocessor 92. This type of microprocessor 92 can be in the form of any suitable microprocessor such as an Intel® or AMD® type microprocessor or ASIC® type microprocessor which is configured to perform calculations or run algorithms. Input and output ports are configured to allow for either direct wired communication or indirect wired communication or wireless communication. An example of the different components that can be coupled in communication with controller is shown in FIG. 1B. Direct communication can be in the form of a single wire or line directly input into ports 93, while indirect communication can be in the form of a connection such as an Ethernet connection to a router such as router 182 which is then configured to communicate via a network protocol such as TCP/IP. Wireless communication is also possible such as through wireless transceiver 96 which can communicate via WIFI such as 802.11 (x) type communication over a network protocol such as TCP/IP. Alternatively wireless transceiver 96 can communicate via Bluetooth communication as well. A power supply 94 is configured to power all of these components coupled to the motherboard 91. Power supply can be in the form of a transformer which has a line coupled to a power network such as in the form of a plug.

A mass storage device 95 can be coupled to motherboard 91 as well. Mass storage device 95 can be a ROM type memory and can be in the form of hard drive or flash memory which stores data such as any of the data fed by the computer network 201 or any data generated by microprocessor 92 in the process of compiling and running the algorithms. A flash memory 97 is also coupled to motherboard 91, flash memory or can comprise a RAM type memory or EEPROM type memory and is configured to allow information to reside in a more temporary operating memory which can include information passed from mass storage 95 into microprocessor 92. For example, algorithms and data can be stored in mass storage device 95. microprocessor 92 can send instructions to run a particular algorithm stored in mass storage device 95 by loading this algorithm into memory 97. This algorithm is then accessed by microprocessor 92 and run on microprocessor 92 by drawing it from memory 97. In addition, data which can be in the form of temperature information, flow rate across pumps, heat prices, maintenance costs, or any other types of costs can also be uploaded into memory 97 from a data source such as mass storage 95 so that processor 92 can perform the necessary steps of an algorithm to determine whether to operate a heating or cooling unit. Any determination made by microprocessor 92 such as a decision or calculation can then be stored at least temporarily in memory 97 and then ultimately stored in mass storage 95.

Another additional optional communication device such as a wireless or cellular transceiver operating such as across a GSM or CDMA network can be used either in conjunction with or alternative to the communication ports such as wireless transceiver 96 or input and output ports 93. Control unit or controller 90 shows multiple different components; however the only required component is essentially a microprocessor 92 because some microprocessors can include a minimal resident memory as well as at least a few pins for outside communication. Alternatively, much of the calculations can be performed by an outside service provider as well such as an outside service provider in LAN 185 shown in FIG. 9. This outside service provider can be in the form of an application server which then pushes these decisions to the cogeneration system as well.

FIG. 10B is a schematic block diagram which serves as an example of the processing systems for a computer such as any one of the computers 190, 201, 203, 205, 206, 207, 208, 209 etc. . . . . This type of system is similar to that shown with controller 90. For example, there is a motherboard 221, a microprocessor 222, a power supply 224, input/output ports 234, a RAM 230, a mass storage 232 and a wireless transceiver 228. Microprocessor 222 can be programmed to perform the algorithms using RAM memory 230 and mass storage 232 in the manner described above with controller 90. Thus, much of the computing of these algorithms and control of data can be done in an outside or distributed manner as well such as on application server 203 which would then perform these calculations or run selected algorithms. The decisions made, such as via application server 203 can then be communicated to controller 90 via computer network 201, or wirelessly and/or cellularly which then selectively sends instructions to the different components or heating units, pumps or valves to selectively turn on or off these components.

Figure 11A:
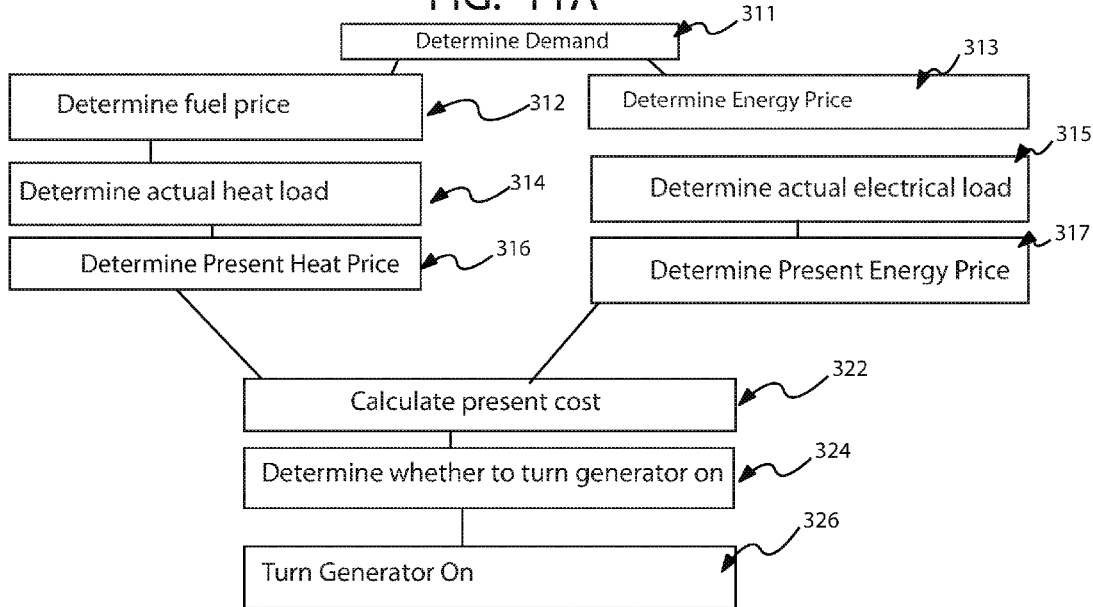
FIG. 11A is a flow chart for a first process for controlling the co-generation system.

FIG. 11A is an example of one of the more basic algorithms that can be performed using either controller 90 and/or application server 203 via microprocessor 92 performing these steps or microprocessor 222 performing these steps. For example, microprocessor 92 or 222 can determine whether there is a demand for heat or electricity in step 311 via inputs from the system such as via inputs from the temperature sensors such as temperature sensor 105 for domestic hot water heater (DHW1) 50 or temperature sensor 127 for the building (See FIG. 5). If the temperature read at these temperature sensors is below a predetermined set temperature which can be stored in a memory such as mass storage 95 or memory 97, or mass storage 232 or memory 230, then microprocessor 92 or 222 can determine whether heat is necessary for the system. Alternatively, if there is a demand for electrical energy this would register in electrical box 40 which would then cause a meter such as an electrical meter to rotate, spin or otherwise change state to register increased demand. This increased demand could then be read by controller 90 or application server 203. If heat is required, then any one of microprocessors 92 or 222 can be used to pull the fuel price from internal memory or the computer network 201 as indicated above in step 312. If electrical power is required, any one of microprocessors 92 and/or 222 can pull the energy prices as well in step 313. Next, any one of microprocessors 92 and/or 222 can determine the actual heat load by determining the flow rate across a particular pump and the temperature differential of the fluids at two different points in the system as indicated above in step 314. Alternatively and/or in addition, microprocessors 92 and/or 222 can determine the actual electrical load via communication with either an electrical box 40 having an electrical meter in step 315.

Microprocessors (micros) 92 and or 222 can then determine the present heat price 316 and or the present energy price 317 which is the fuel price in combination with the total heat load for the case of the present heat price, or the current energy price in combination with the actual energy load to determine the present energy price. Another form of stating this is as follows:

$$BC=((OP)*(HL)*((K)/(EB)) \text{ where}$$

BC=Present heat price for operating the boiler which can include alternative calculations below;
OP=operating price which includes the fuel price such as in currency per measured unit (for example $/gallon of fuel) $/hundreds of cubic feet per fuel or any other suitable measurement and any other operating costs such as but not limited to maintenance costs;
HL=heat load which can be in the form of BTU or Joules or any other form of measuring heat load;
K is a constant which can be used if necessary to provide an accurate price for heating a section of the system using fuel;
EG is the efficiency of the generator;
Or in step 317 the present energy price can be calculated as follows:

$$PEP=(EP)*(EL)*(KE) \text{ where}$$

PEP=present energy price which is the amount in currency being used across a particular time period such as $/KW/h;
EP=is the price of energy in KW/h
EL is the electrical load in KW;
KE is a constant which can be added if necessary. This present energy price is the price of obtaining energy from an outside energy distributer such as an electric utility or a regional provider 207.

Then, based upon these calculations, microprocessor 92 or microprocessor 222 can in step 322 selectively calculate the present cost for both heat and energy for the system which is generated by an alternative heat source and an alternative energy source. This can be calculated by the following basic formula:

$$PC=BC+PEP; \text{ where}$$

PC=present cost which is the estimated short term cost to meet both the current heat demand and the current energy demand. The present energy price is subtracted from the total cost from running the generator in this equation because the building would otherwise have to pay and access this energy from a utility.

Microprocessors 92 and/or 222 can then use this calculation and or the HP or the PEP to determine whether to turn the generator on in step 324. If micros 92, and/or 222 determine that a heating unit such as generator 20 should be turned on, then in step 326 it is turned on. This determination can be performed separate from the calculations shown in FIGS. 15, 17, and 18 in that with this equation if the total cost to heat and power a residence is so minimal, it may not be cost effective to turn a co-generation system on, regardless of whether there is a cost savings over using a standard heat and electrical power system.

Figure 11B:
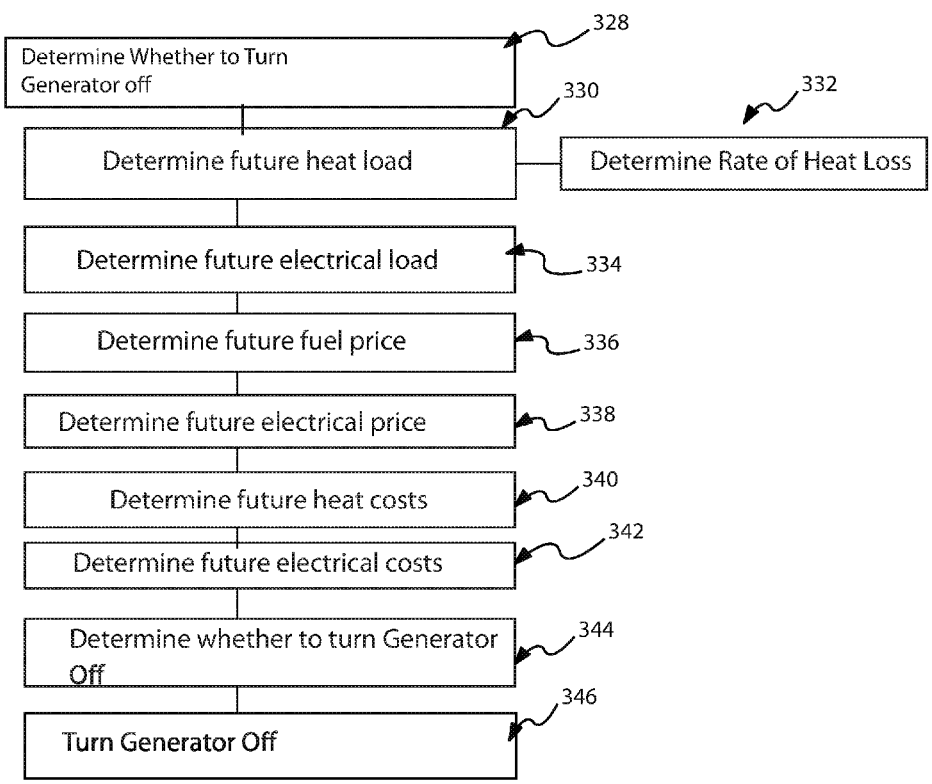
FIG. 11B is a flow chart for operation of the co-generation system.

FIG. 11B shows the flow chart for determining whether to turn the heating unit such as generator 20 off. This can be initiated in step 328 wherein microprocessors 92 and/or 222 initiate this algorithm to determine whether to turn the generator off by determining a future heat load in step 330. This step includes polling past usage data as well as determining the time of day as well as the current condition of the system. For example, in the morning, the heat requirements may change across time as a building or dwelling has automatic timed temperature increases to meet the needs of its inhabitants. For example, a standard home or business thermostat may be programmed to raise a suggested temperature setting for a dwelling from a first temperature setting such as at 65 degrees Fahrenheit to 70 degrees Fahrenheit when the time of day crosses a predetermined time such as 8:00 A.M. Thus, the expected heat demand on a heating system will change when the time of day crosses this time. Thus, micros 92 and/or 222 are configured to calculate or determine the time of day, and the expected heat demand changes based upon the time of day. Other factors that are included in this calculation include the rate of heat loss in the dwelling or domestic hot water system DHWS 50 in step 332. The rate of heat loss can be affected by the level of insulation in a building or in a domestic hot water system DHWS 50, or the efficiency of these systems. For example, an uninsulated building or a poorly insulated building or a building with a portal such as a door or window that is open will allow much greater heat loss than a well-insulated building with closed portals.

Microprocessors 92 and/or 222 can also be configured to determine the future electrical load 334 as well. This future electrical load 334 can also be calculated based upon the time of day/year, and past history of energy use. For example, in the morning, the energy demand would increase as users enter an office or turn on lights in their homes. Past acts that influenced this energy demand can be stored in the system such as in database 201 in database server 202 or in mass storage devices 95 or 232. Statistical modeling can be used to determine future expected electrical loads based upon the time of day and these past acts. The time of year can affect energy loads as for example, there is usually less sunlight in the northern hemisphere during winter. Similarly, future fuel prices can be determined as well. These future fuel prices can be obtained by the polling the computer network 201 to determine the price of fuel. This price of fuel can fluctuate across a time period such as every fifteen minutes. In at least one embodiment, microprocessors 92 and/or 222 can, not just calculate, but automatically purchase fuel based upon these present or future fuel prices. Future electrical prices can also be determined by microprocessors 92 and/or 222. Future electrical prices can be determined based upon a floating electrical price via an exchange as described above via data source 207, or as provided by an electrical utility via data source 205. Electrical utilities commonly raise or lower electrical prices over a period of time, particularly such as every five minutes, every 10 minutes, every 15 minutes, every hour based upon either the time of day or existing demand on the system. Utilities can set different rates based upon the time of day such that "peak" hours might cost more than off hours. Rates can also be readjusted based upon a spike in demand or any other reason that these utilities deem necessary. Therefore, based upon either indications from the utility data source 205 or past information stored in database 201, an expected future electrical price can be determined. From these future prices, and future loads, the future heat costs in step 340 can be calculated by any one of microprocessors 92 and/or 222 and/or the future electrical costs 342 can be calculated by any one of microprocessors 92 and/or 222. Next, based upon these future costs any one of microprocessors 92 and/or 222 can determine whether to turn the energy unit such as generator 20 off in step 344. Once this determination is made to turn it off, it can be turned off in step 346.

Figure 12:
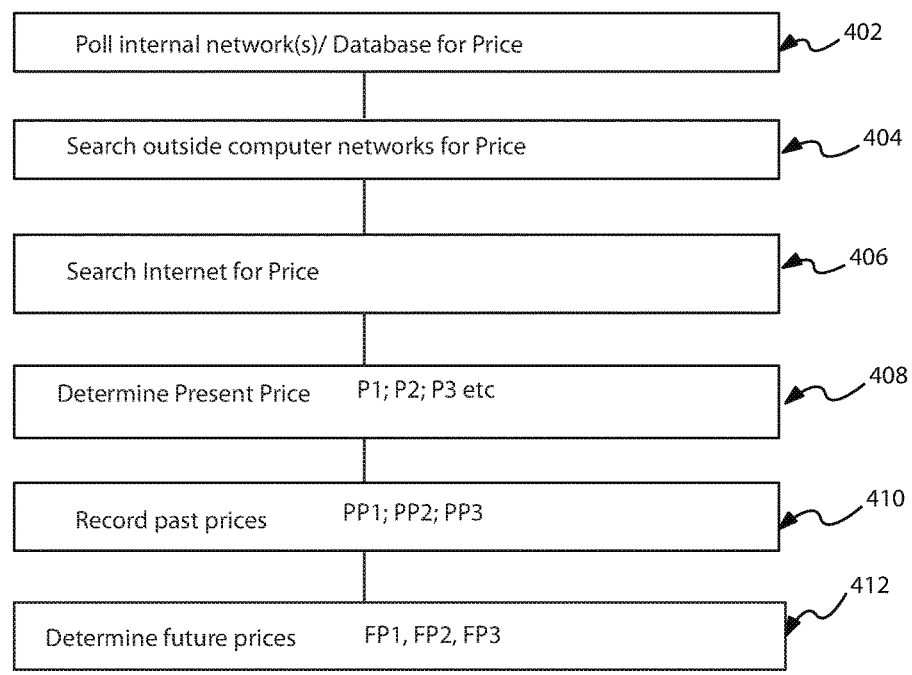
FIG. 12 is a flow chart indicating the information processing for the system.

Another cost that can be included in this calculation can be maintenance costs (MCG) for maintaining the generator. Continuous operation of a generator 20 may be less costly than consistent starting and stopping of a generator which can create strain on the components by varying the compression in the internal combustion engine. Therefore, these costs can also be used to determine whether to shut a generator off. As indicated above, the determination of whether to turn on an energy source or heat source is highly correlated with prices which can be provided over a computer network. Any one of microprocessors 92 and 222 can be configured to pull the information necessary to provide for the determination of turning on or off these energy units by pulling information or receiving information located on the computer network. For example FIG. 12 shows the process that microprocessors 92 and/or 222 can perform to obtain this pricing information. This process can be performed simultaneously or substantially simultaneously with the process shown in FIGS. 11A and 11B or separate from these steps so that the pricing information is on hand even if a connection to a computer network goes down.

This process starts in step 402 wherein any one of microprocessors 92 and/or 222 poll an internal network such as the local memory storage 95, 97 for micro (microprocessor) 92 or memory storage 230 or 232 for micro 222. This polling can alternatively or in addition poll computers located on the local area network such as on LAN 183 (computer 190), and/or LAN 185 (database server 201). If the information necessary for these calculations of the algorithms is not current or available, then micro(s) can search outside the local computer networks 183, 185 in step 404 such as over the internet in step 406. The pricing information, for present prices can be determined by micro(s) 92 and/or 222 in step 408 and then stored such as in mass storage 95, or 232 or memory 97 or 230 or stored in a database in computer 190 or in a database 202 in database server 201. Once the information is deemed old or no longer current, this information can be stored as past prices in step 410 by micro(s) 92 and/or 222. Future prices can also be pulled and stored in step 412 by micro(s) 92 and/or 222 by pulling this information in from the computer network 201 as described above. Thus, present, past and future prices for electrical energy and heat can be stored in a database in the system such as in database 202 in database server 201 or in a database stored in mass storage 95 or in a database stored in mass storage 232 such as in computer 190 as well.

Figure 13:
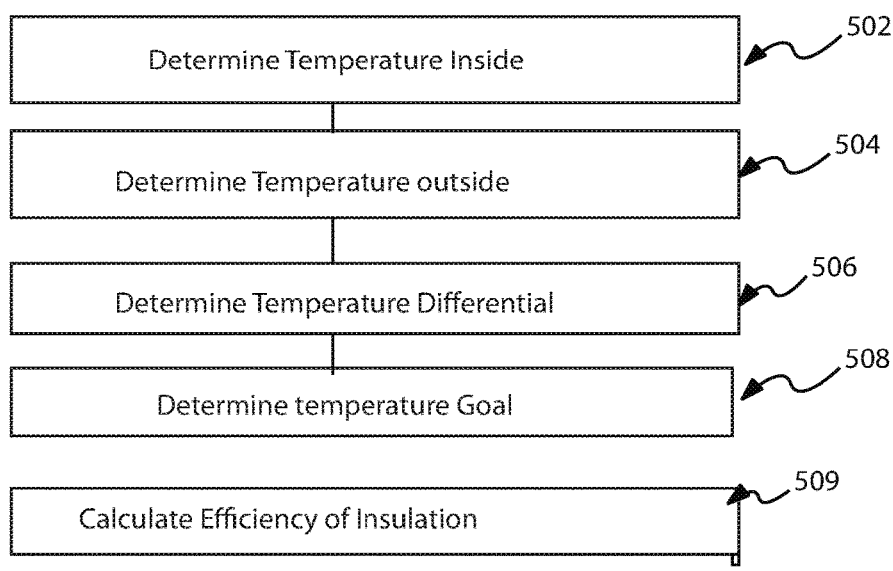
FIG. 13 is a flow chart for determining whether additional heat should be added to the system.

FIG. 13 shows a process which can be performed by any one of micro(s) 92 and/or 222 to determine at least one factor for the future heat load based upon environmental factors. For example, in step 502 the temperature inside of a building can be determined by temperature sensor HC 127. Next, in step 504 a temperature outside of a building can be determined as well. This can be done using an outdoor temperature sensor such as a thermometer which is in communication with the computer network 201. Next any one of micro(s) 92 and/or 222 determines the temperature differential in step 506. Next, any one of micro(s) 92 and/or 222 determines the temperature goal in 508. Next, in step 509 micro(s) 92 and/or 222 calculate the efficiency of the insulation on the building to determine the expected rate of heat loss on a building based upon a temperature differential between the inside of the building and the outside of the building. For example, if the building had a highly efficient form of insulation, then the heat loss across even a high temperature differential would be relatively minimal. However, this expected heat loss would still likely be larger than if the temperature differential was smaller. Alternatively, if the insulation efficiency of the building was low then the temperature differential would have a much greater impact on future heat loss from a building and thus increase the demand for future heat and result in a higher future heat load. This determination or calculation can then be used to determine whether to turn a generator such as generator 20 off as shown in FIG. 11B. FIG. 14 is a flow chart for determining whether to use a heat providing unit such as a generator using the system shown in FIG. 5. This process can also be used for determining the thermal load of a building at a certain point in time. For example, the process starts in step 601, wherein controller 90 starts pumps 112 (P1) and 131 (P5) in step 602. Next, in step 603, controller 90 (using microcontroller 92) detects temperatures T1 and T3 at sensors 125 and 132 respectively. Next, in step 604, controller 90 determines if there is a thermal load by determining the temperature differential between T1 and T3 and the flow rate past a pump such as pump 112 (P1). In this case the thermal load can be calculated as $TL=(T1-T3)*(GPM@P1)*K1$ where T1 (temperature at temperature sensor 125), and T3 (temperature at temperature sensor 132) are temperatures as indicated above;

GPM@P1 is the flow rate at pump 112; and

K1 is a constant to determine thermal load in a measurable unit such as BTU or Joules.

If there is no thermal load then controller 90 or 220 determines whether it is favorable to generate in step 605. Alternatively, if there is thermal load, then controller 90 determines whether it is favorable to generate in step 606. These calculations are performed using microcontroller 92 using data fed from memory 97 and drawn from data stored in a database such as in mass storage 95 or any other suitable database such as database 202 stored in database server 201.

If there is thermal load, and it is favorable to generate, then controller 90 proceeds to start generator 20 in step 608. Alternatively, if it is not favorable to generate but there is thermal load, then controller 90 or 220 proceeds to step 615 to stop generator 20. If generator 20 is started and there is thermal load, then controller modulates pumps 112 (P1), and 131 (P5) to maintain temperatures T2 and T3 via variable speed motors. This is done by microprocessor 92 or 222 sending and receiving data to the selected pumps 112 (P1), and pump 131 (P5). Next, controller 90 via microprocessor 92 or controller 220 via microprocessor 222 determines if there is an existing thermal load that is continuing in step 613. If there is no thermal load, then the process ends in step 616 wherein the generator stops 615 and the pumps stop as well.

Alternatively, if there is no thermal load, controller 90, via microprocessor 92, or controller 220 via microprocessor 222 determines whether it is favorable to generate as indicated in step 605. If it is favorable to generate, then controller 90 via microprocessor 92, or controller 220 via microprocessor 222 starts generator 20 in step 607. In addition, if heat is not necessary to the system, then controller 90 via microprocessor 92 and/or controller 220 via microprocessor 222 starts the heat rejection radiator system 84 by starting radiator 89 in step 609. Next, in step 611, controller 90 via microprocessor 92, and or controller 220 via microprocessor 222 determines whether there is thermal load. If there is still no thermal load as determined in step 611 then the process goes back to step 605 wherein controller 90 via microprocessor 92 determines whether it is favorable to generate. If there is a thermal load as determined in step 611, then controller 90 via microprocessor 92, and or controller 220 via microprocessor 222 modulates pumps 112 (P1), 131 (P5) and the radiator system 84 to maintain temperatures T2 and T3 via the variable speed motors of pumps 112 and 131 which are controlled by controller 90, particularly via instructions sent from microprocessor 92 or microprocessor 222. If it is determined that there is no thermal load and it is not favorable to generate in step 605, then controller 90 via microprocessor 92 and/or controller 220 via microprocessor 222 is configured to stop generator 20 in step 614.

Figure 15A:
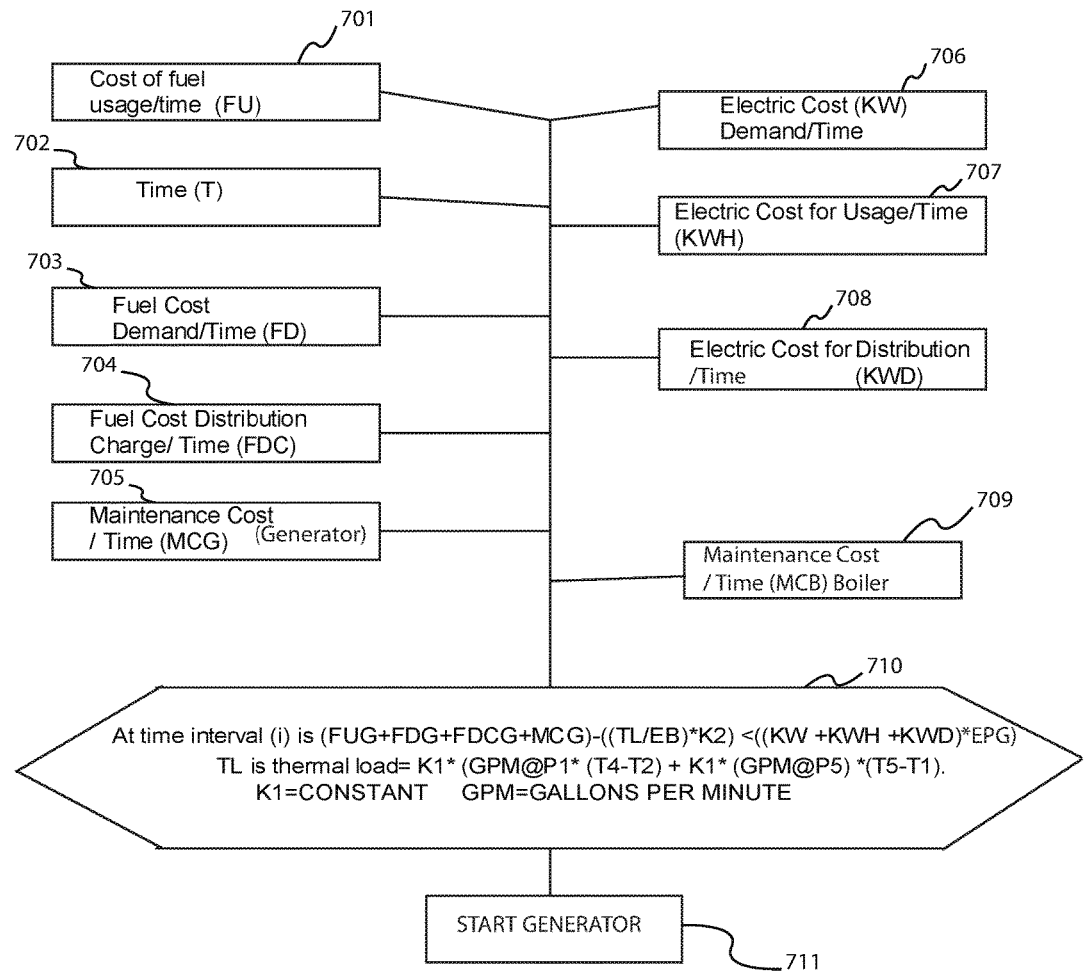
FIG. 15A is a flow chart for the process for determining whether to operate a co-generation system using a particular formula.
Figure 15B:
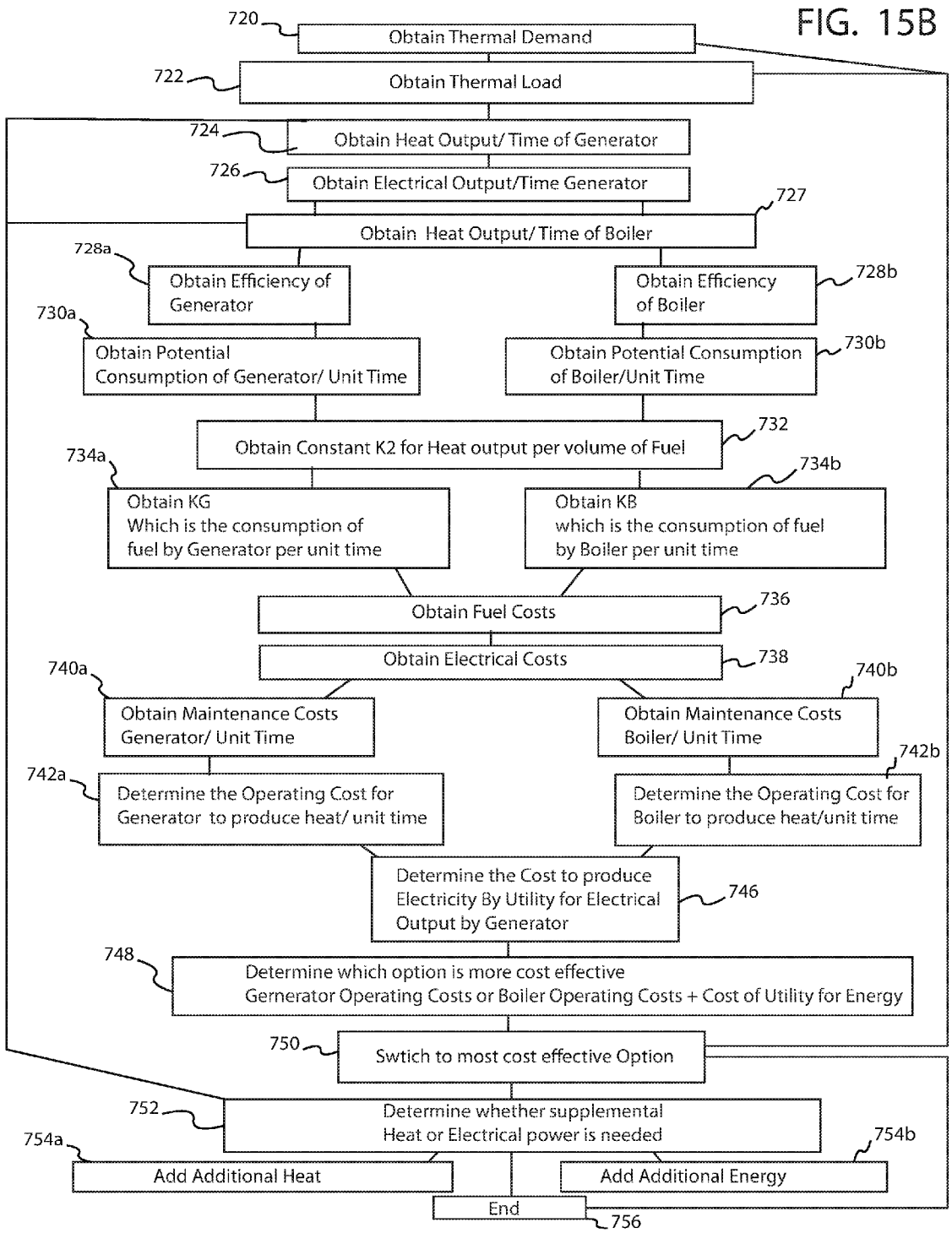
FIG. 15B is a flow chart for an alternative process for determining whether to operate a co-generation system using a particular formula.

FIG. 15A is a flow chart for a process for determining whether to use a generator such as generator 20 or a boiler such as any one of boiler 60 or 70 using a simplified formula. The step of determining whether it is favorable to generate is disclosed in steps 605 and 606 in FIG. 14. For example, this process starts in step 701 wherein micro(s) 92 and/or 222 obtain the cost of fuel (FU) per usage/time. The remaining steps all include operations performed by any one of micro(s) 92 and/or 222 alone or together. For example, step 702 includes obtaining a time (T), and step 703 obtaining a fuel cost per demand/time (FD). Step 704 includes obtaining a fuel cost distribution change/time (FDC). Step 705 includes obtaining a maintenance cost per time (MCG). Step 706 includes obtaining an electric cost (KW) per demand/time, step 707 includes obtaining an electric cost usage (KWH), and step 708 includes obtaining and an electric cost distribution (KWD). These costs can be pulled from the computer network such that the electrical costs in terms of KW, KWH, and KWD can be pulled from the electrical utility data source 205. Step 709 includes obtaining a cost for maintaining the boiler over a period of time. This step can include polling outside sources or obtaining this data internally.

Alternatively, this information can be pulled from an alternative data source such as data source 207 which is a regional market such as PJM® which sets fluctuating energy or electrical rates over a floating trading market. The fuel costs which are the current fuel costs can be obtained by polling data source 206 which can be coupled to computer network 201. Data source 206 can be a utility fuel provider such as a gas provider which sets rates for the distribution of this fuel. Alternatively, the fuel rates and the source of fuel can be provided by a floating market which has floating prices provided by data source 207. This information can be stored in database 202, in database server 201 and processed by microprocessor 222 in application server 202, stored in home computer 190 in a database therein and then processed by a microprocessor such as microprocessor 222, or stored in a mass storage device such as mass storage device 95 and processed by microprocessor 92 in controller 90. Thus, either microprocessor 92 or 222 (of either application server 203 or home computer 190) is configured to perform step 710. Step 710 involves determining whether to start the generator by determining the following:

At a time interval ti (t1 ... t2) is ((FUG+FDG+FDCG+MCG)−((TL/EB)*K2)<(KW+KWH+KWD)*EPG/Time?. If so then the micro(s) such as any one of microcontroller 92 and/or 222 starts a cogeneration unit such as generator 20, wherein TL=TLB+TLDHW=(K*(GPM@P1*(T4−T2))+(K*(GPM@P5)*(T5−T1)

wherein FU is the cost of fuel in volume over usage/time (time interval ti);

FUG is the cost of fuel over usage/time for the generator when meeting the thermal load or (FU*KG);

t is the time, which can be the immediate time;

FUB is the cost FU for the boiler or (FU*KB);

ti is the time interval from a first time t1 to a second time t2;

FD is the fuel cost for the demand/time interval (ti) this is usually a surcharge calculated usually calculated based upon a peak demand point over a period of time, FDG is the cost of FD/time when using the generator to meet the thermal load or (FD*KG);

FDB is the cost of FD/time when using the boiler to meet the thermal load or (FD*KB);

MCB is the maintenance costs for the boiler/time;

FDC is the fuel cost distribution charge/Time interval ti this is the charge the utilities charge for distributing fuel for the generator;

FDCG is the cost of FDC/time when using the generator to meet the thermal load or (FDC*KG);

FDCB is the cost of FDC/time when using the boiler to meet the thermal load or (FDC*KB);

MCG is the maintenance costs for the time interval ti for the generator;

EB is the efficiency coefficient for a boiler or alternative heat source which translates the thermal load in heating units into heating costs for the boiler or alternative heat source;

BMC is the boiler maintenance costs over time;

K2 is the constant or coefficient used to translate the expected heat produced by the boiler into a cost;

KW is the electric demand costs per the time interval ti for the power generated by the generator but calculated based upon current electrical utility rates;

KWH is the electrical usage costs KWH per time interval ti for the power generated by the generator but calculated based upon current electrical utility rates;

KWD is the electrical distribution cost for time interval ti for the power generated by the generator but calculated based upon current electrical utility rates;

EPG is the amount of electrical energy produced by the generator during operation/time (ti);

TL is the thermal load (in BTU or Joules);

TLB is the thermal load for the boiler;

TLDHW is the thermal load for the domestic hot water heater;

GPM is gallons per minute or flow rate across a particular pump;

P1 is pump 112;

P5 is pump 131;

T1 is the temperature at temperature sensor 129;

T2 is the temperature at temperature sensor 105;

T4 is the temperature at temperature sensor 133,

T5 is the temperature at temperature sensor 135, and

K1 is a constant which is used to determine the thermal load based upon the flow rate past a point and a temperature difference at two different points;

These above variables include any additional charges such as any appropriate taxes that are to be included in calculating these amounts.

The portion ((TL/EB)*K2) is used as an approximate amount for the cost for running a boiler to meet a thermal load of a building. A more particular value for the alternative cost is provided as:

(FUB+FDB+FDCB+MCB).

This value is calculated as shown in the discussion relating to FIG. 17 below. 15B is the flow chart for determining whether to use a cogeneration system 10 such as one using generator 20 or a boiler such as boiler 60 and/or 70 and additional energy from an electrical utility.

Figure 16:
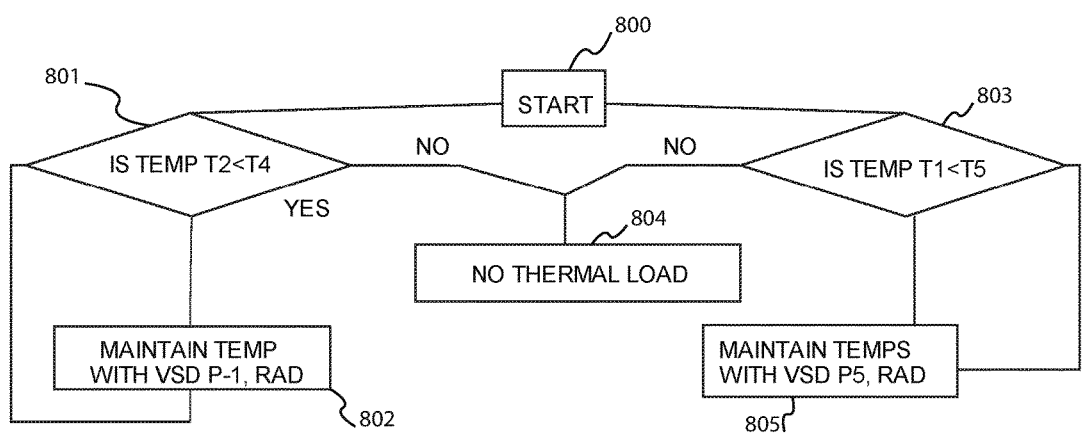
FIG. 16 is a flow chart for determining whether there is thermal load.
Figure 17:
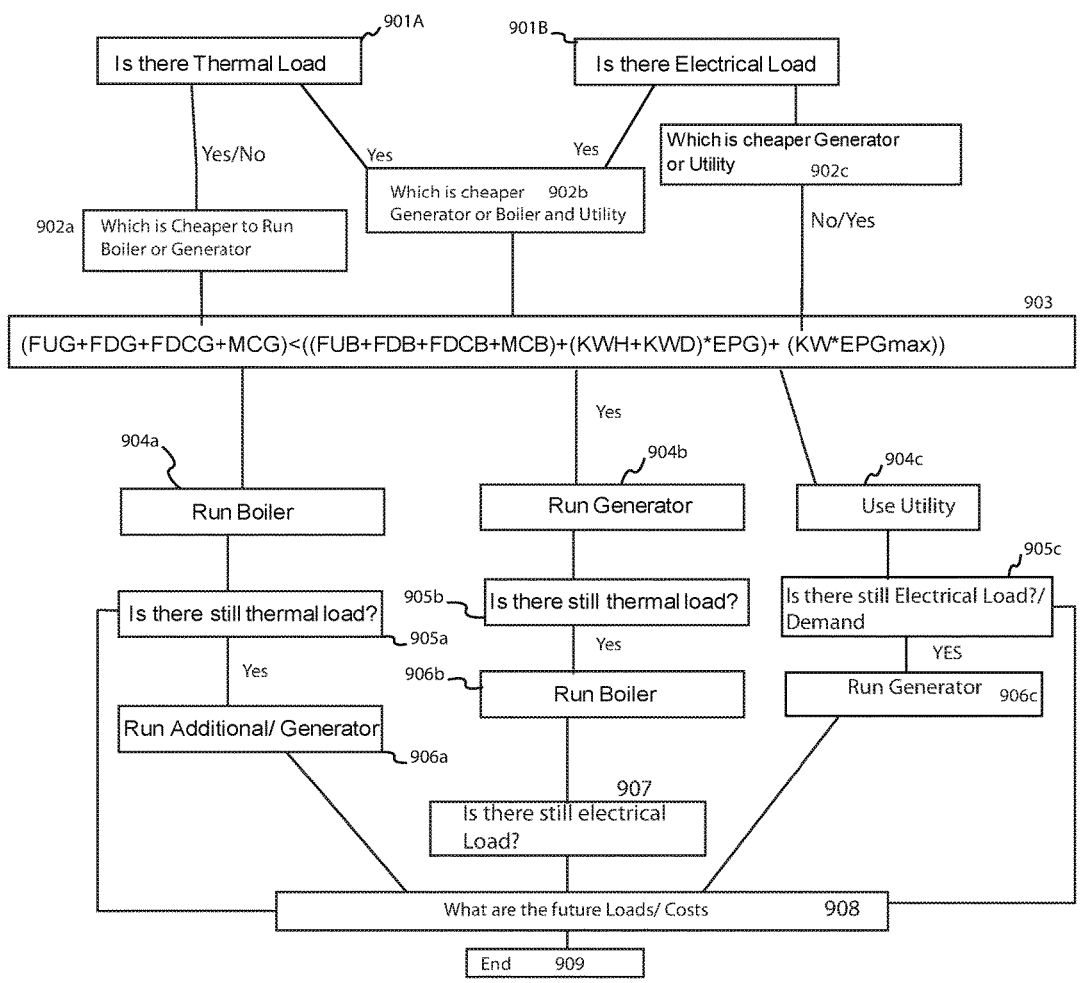
FIG. 17 is a flow chart for determining whether to operate the co-generation system using another formula.

This step involves using the process outlined in greater detail in FIG. 16 for determining thermal load as well as the process outlined in FIG. 17 for determining the cost effectiveness of either the cogeneration system 10, particularly the generator 20, or the cost effectiveness of using the boiler such as boiler 60 and/or 70 and the costs of the outside utility. For example, the process starts in step 720 wherein the system determines or obtains results for a thermal demand. For this process, the system can be the microprocessor 92/and or microprocessor 222 running a set of instructions stored on an associated memory such as memory 97 and/or memory 230 and consequently uploaded and running on microprocessor 92 and/or microprocessor 222.

Next, the system obtains the thermal load using the process outlined in FIG. 16 and using the formula for thermal load outlined with respect to FIG. 15A and shown below:

$$TL=TLB+TLDHW=(K1*(GPM@P1*(T4-T2))+(K1*(GPM@P5)*(T5-T1))$$

Next, in step 724 the system determines the amount of heat output per time for the generator. This amount can be a pre-set amount, stored in a memory and predetermined by the manufacturer of the generator. This preset amount can be pre-stored on the generator memory such as memory 95 or 97, or stored on a remote memory such as memory 230 or 232 and downloaded from the computer network. Alternatively, this amount can be an actual operating amount recorded over time based upon usage of the generator. The electrical output for the generator 20 can also be obtained in step 726. Likewise this amount can be either pre-set, by the manufacturer and stored internally on the generator memory or stored remotely and downloaded. Alternatively this amount can be calculated based upon the usage of the generator and the actual output over time. These values can then be periodically updated and averaged over time. These values can also be uploaded to an associated memory such as memory 230 or 232 in controller 220 to update these values.

Next, in step 728 a the efficiency of the generator (EG) such as generator 20 can be obtained. This efficiency can be an amount that is either pre-set by the manufacturer or determined based upon the operation of the generator over time. These values can be either pre-stored in the memory 95 and/or 97 downloaded through the computer network, or stored and averaged over time in the memory 95 and/or 97 in a similar or same manner as outlined above for the values for the heat output for the generator and the electrical output for the generator.

Next, in step 728 b the efficiency of the boiler is obtained. As outlined above, this efficiency of the boiler can be either preset by the manufacturer and stored in the memory 95 and/or 97 of the generator, downloaded from an outside source to the memory 95 and/or 97 of the generator or to the memory of controller 220 or determined based upon the actual usage of the boiler in meeting any thermal demand over time. The actual values could then be periodically updated and then averaged to provide a relatively accurate efficiency rate for the boiler.

Next, in step 730 a the system obtains the potential consumption of the generator over time in meeting the thermal demand. This consumption of the generator or (CG) is obtained by taking the heat output (HO) and dividing it by the efficiency of the generator (EG) as follows:

$$CG=(HO/EG).$$

Similarly, in step 730 b the system obtains the potential consumption of the boiler over time in meeting the thermal demand. This consumption of the boiler (CB) is obtained by taking the heat output (HO) as provided above and dividing it by the efficiency of the boiler (EB)

$$CB=(HO/EB)$$

Next, in step 732 the system obtains or accesses a constant K2 for heat produced vs. volume of fuel. In the examples provided below, this constant can be based upon the heat produced in BTU's or British thermal units per unit time such as per hour, while the volume of gas or natural gas is denoted as CCF, which denotes hundred of cubic feet of gas, and form a conversion ratio of BTUH/CCF. This ratio is associated with constant K2 and is used to translate the costs of running the generator/time into a corresponding heat produced to meet a thermal load.

Next, in step 734 a the system obtains KG which is the consumption of fuel by the generator/time in meeting the thermal load and which is determined as follows:

$$KG=(CG/K2).$$

In step 734 b the system also calculates or obtains KB which is the consumption of fuel by the boiler/time in meeting the thermal load and which is determined as follows:

$$KB=(CB/K2)$$

In step 736 the system obtains the fuel costs. These fuel costs can be stored internally in memory such as in memory 95, and/or 97 of controller 90, or stored in memory 230 and/or 232 in controller 220. The fuel costs can also be downloaded from an outside source as well as outlined above. These costs can be as follows: fuel usage charge hereinafter FU which is fuel usage/volume of fuel; fuel demand charge hereinafter FD which is fuel demand/volume of fuel; or fuel distribution charge hereinafter FDC or fuel distribution charge/volume of fuel.

In step 738 the system is configured to obtain the electrical costs as well. These electrical costs can be stored internally in memory such as in memory 95, and/or 97 of controller 90, or stored in memory 230 and/or 232 in controller 220. The electrical costs can also be downloaded from an outside source as well as outlined above. An example of electrical costs are electrical demand charge KW, electrical usage charge KWH, and electrical distribution charge KWD.

Step 740 *a* involves obtaining the maintenance costs of the generator/time. This cost can be obtained in a manner outlined above with respect to step 705 in FIG. 15A.

Step 740 *b* involves obtaining the maintenance costs of the boiler/time. This cost can be obtained in a manner outlined above with respect to step 709 in FIG. 15A.

Step 742 *a* involves the system obtaining or determining the operating cost for the generator to meet the thermal load/time. This is calculated using the formula outlined in FIG. 17.

Generator costs per time($GC$)=($FUG+FDG+FDCG+MCG$);

These variables have been defined above.

Step 742 *b* involves the system obtaining or determining the operating costs for the boiler to meet the thermal load/time. This is calculated as follows:

Boiler costs per time($BC$)=($FUB+FDB+FDCB+MCB$);

These variables have been defined above.

Step 746 involves determining the cost to produce electricity by the utility based upon the electrical output of the generator/time. This is calculated as follows:

Comparable electrical costs from Utility($EC$)=(($KWH+KWD$)*$EPG$)+(($KW$)*$EPG\text{max}$)

Where:
KW is the demand charge/time in KWH from a utility,
EPG max is the maximum amount of power produced over a period of time which may be longer than t1 . . . t2 but include t1 . . . t2. KW is applied only if a predetermined amount is reached by the generator. This predetermined amount is set by the outside electrical provider such as an electrical utility and which is usually applied during peak hours;
KWH is the usage charge/time in KWH from a utility;
KWD is the distribution charge/time in KWH from a utility which is the cost of distributing energy or structural costs of delivering energy from a utility;
EPG is the amount of electricity produced by the generator/time.

Step 748 involves determining which option is more effective, to use the generator or to use the boiler and incorporate the costs of using the electricity obtained by the alternative source such as a utility. This step assumes that the basis of this concept is best applied to buildings that use the generator as the first stage of heat and the electricity that is output is either used in the building or leaked out to the electric grid with the benefit of net metered electric meters. That is in at least one embodiment, the amount energy produced by the generator and the value of this energy can be used regardless of whether there is excess energy produced by the building because this excess energy can then be fed back into the electrical grid and used by an electrical utility. Thus, this excess energy can be sold back to the utility.

This formula is outlined in FIG. 17 (formula (F1)) and is as follows:

($FUG+FDG+FDCG+MCG$)<($FUB+FDB+FDCB+MCB$)+(($KWH+KWD$)*$EPG$)+($KW$*$EPG\text{max}$))

With the definitions for the variables provided above.

Step 750 involves the controller such as controller 90 or controller 220 switching to the most cost effective option. This step involves microprocessor 92 selectively switching off any one of boilers 60 or 70 (if necessary) and turning on generator 20 or selectively switching off generator 20 (if necessary) and turning on any one of boilers 60 or 70. Alternatively, if this system is remotely controlled microprocessor 222 can remotely turn off any system that is not cost effective such as generator 20, or any one of boilers 60, or 70 and remotely turn on any system or unit that is cost effective such as any one of generator 20 or boilers 60, and/or 70.

Step 752 involves microprocessor 92 and/or microprocessor 222 determining whether supplemental heat or electrical power is needed. This is determined by the associated microprocessor determining whether the thermal load can be met within a predetermined period of time or whether there is a need for additional electrical power.

If for example, microprocessor 92 and/or microprocessor 222 determines that additional heat is necessary, microprocessor 92 can add an additional heating unit such as by adding an additional boiler such as boiler 60 and/or 70 to generator 20 or by adding generator 20 to boiler 60 or 70 in step 754 *a*. This can occur even earlier such as in steps 724 or 727.

If for example microprocessor 92 and/or microprocessor 222 determines that additional electrical power is needed, the electrical box can access this electrical power either automatically by simply having electrical energy drawn into electrical box 40 or by selectively searching for and obtaining an alternative electrical source such as any one of the electrical sources shown in FIG. 1B including but not limited to the alternative electrical sources 170. It is noted that any one of the above steps not necessarily required. In particular, steps 752, 754 *a* and 754 *b* are noted as optional steps in an alternative embodiment.

This process can either end as shown in step 756 if there is no thermal load or demand or it can cycle back to the beginning as well.

FIG. 16 is a more detailed flow chart of one embodiment for determining whether there is thermal load in the system such as the system shown in FIG. 5. In this embodiment any decision by the "system" is a decision by any one of microprocessor 92 and/or microprocessor 222. For example, the process starts in step 800 wherein any one of micro(s) 92 and/or 222 determine(s) whether the temperature $T2<T4$. If "yes", then the system moves to step 802 wherein the system any one of micro(s) 92 and/or 222 maintains the temperature by using pump P1 (112) and by operating the pump at radiator system 84. This bleeds heat from the system. Alternatively, if the answer is "no" then the system proceeds to step 804 to determine that there is no thermal load in step 804. In addition the system can determine in step 803 the following:

Is temp T1<T5? If yes, then the system proceeds to step 805 to maintain temperature with pump P1 112 and valve 89.4. If no, then the system determines that there is no thermal load.

FIG. 17 is a flow chart showing an alternative process for determining whether to run the boiler or the generator or to use an electrical utility in circumstances where there is simultaneous, but independent thermal load and electrical load or thermal load alone or electrical load alone. This process can use either one of the processes outlined in FIG. 15A or 15B but is shown in a more simplified manner herein. The processing is therefore performed using any one of microcontroller 92 and/or microcontroller 222. The process starts in step 901 $a$ wherein the system determines if there is a thermal load or step 901 $b$ where the system determines if there is electrical load. If there is thermal load and no electrical load, then the system moves to step 902 $a$ where it determines whether it is less expensive to run the boiler or the generator in producing heat only. Alternatively, if there is both thermal load and electrical load then the system moves to step 902 $b$. If there is only an electrical load, then the system moves to step 902$c$. Regardless of the answer, the system moves to step 903 using the following formulas:

At a time interval ti (t1 ... t2) is GC<(BC+EC) hereinafter known as formula (F1) which more particularly is:

$$(FUG+FDG+FDCG+MCG)<(FUB+FDB+FDCB+MCB)+((KWH+KWD)*(EPG))+(KW*EPGmax)) \quad (F1)$$

where
(FUB+FDB+FDCB+MCB)=BC and is the fuel and maintenance costs for the boiler which are involved in producing heat to meet the thermal load (TL);
(FUG+FDG+FDCG+MCG)=GC and is the costs including fuel and maintenance costs associated for the generator;
(KWH+KWD)*EPG+(KW*EPGmax)=EC which is the cost for obtaining the electrical power produced by the generator when meeting the thermal load from an alternative source such as an electrical utility.

The terms FU, FD, FDC, MCG, MCB, FUB, FDB, FDCB, FUG, FDBG, FDCG, KW, KWH and KWD are defined above with respect to the formula shown in FIG. 15.15. The terms B and G are presented to represent where the costs are associated. In addition, these above variables include any additional charges such as any appropriate taxes that are to be included in calculating these amounts. The terms KW, KWH and KWD are used in this equation at current electrical rates and therefore take a credit for cost of operating the defrayed cost of electricity from the electrical grid.

In another way,
GC*EG=TL; or
BC*EB=TL wherein
GC is the cost of running the generator to produce the heat;
BC is the cost of running the boiler to produce the heat
EG is the efficiency of the generator in meeting the thermal load (TL); and
EB is the efficiency of the boiler in meeting the thermal load (TL).

Because the boiler is generally considered more efficient at producing heat, EB will generally be higher than EG. However a boiler does not produce electricity, therefore, the positive by product of the cogenerator, that of electrical power may overcome this difference in efficiency by the cost savings of a building not having to turn to outside power utilities.

Thus, if it is determined that it is less expensive to run the boiler or "YES" to the above equation, then the boiler such as boiler 60 or 70 is started in step 904 $a$. Alternatively, if it is less expensive to run the generator regardless of whether there is an electrical load, then the system proceeds to step 904 $b$ to start and run the generator 20. If there is no thermal load and the system determines that it is less expensive to access the utility than generate electricity using the generator then the system proceeds to step 904 $c$. For example, while the above formula is used if there is both thermal load and electrical load, the same but simplified formula can be used to determine whether to run the boiler or the generator when there is no electrical output or demand:

$$(FUB+FDB+FDCB+MCB)<(FUG+FDG+FDCG+MCG)$$

This formula determines whether the cost of running the generator with no electrical output is less expensive than the cost for obtaining heat from the boiler.

Proceeding from step 904 $a$, once the boiler is running, if there is still additional thermal load and a thermal demand as determined in step 905 $a$, and the capacity of the boiler cannot meet all of the thermal demand, then the system can be configured to run the additional generator in step 906 $a$. If there is no additional thermal load or no thermal load at all and no demand, then the system proceeds to step 908 to determine whether there are future loads or costs. This step is outlined in greater detail in FIG. 18 and is used to anticipate whether to switch from the boiler to the generator, or from the generator to the boiler or from the generator to the electrical utility or from the electrical utility to the generator based upon periodic changes in fuel rates and electrical utility rates.

If the generator is running in step 904 $b$, then the system also determines whether there is additional thermal load in step 905 $b$. If yes, then it proceeds to step 906 $b$ to start the additional heating unit such as the boiler. If there is also an additional electrical load then it proceeds to step 907 to access power from the electrical utility as well. As there should be no interruption from power, this step 907 can be performed at any stage in the process, particularly earlier than presented.

Alternatively, if there is an electrical load 907, and no thermal load, then the system determines whether it is less expensive to use the generator or a utility. This is performed using the formula shown in step 903. However, in this case, if there is no thermal demand, then the formula is as follows for meeting electrical demand:

$$(FUG+FDG+FDCG+MCG)<((KWH+KWD)*EPG)+(KW*EPGmax))$$

This formula determines whether the cost of running the generator with no heat output is less expensive than the cost for obtaining electricity from the electrical utility. This type of analysis would typically be performed in the warmer months when there is no heat demand for building heat and DHW1 50 does not currently demand heat.

If yes, then the system proceeds to step 904 $b$ to run the generator 20. Alternatively, if no, then the system proceeds to step 904 $c$ to simply rely on electrical energy from the utility.

If there is still an electrical load or a demand as considered in step 905 $c$ then the system can proceed to step 906 $c$ to start the generator as well. Next, in determining whether to turn off the generator, or to switch from the electrical utility to the generator for future electrical use, the system can consider future costs for fuel, and electrical rates in step 908.

Figure 18:
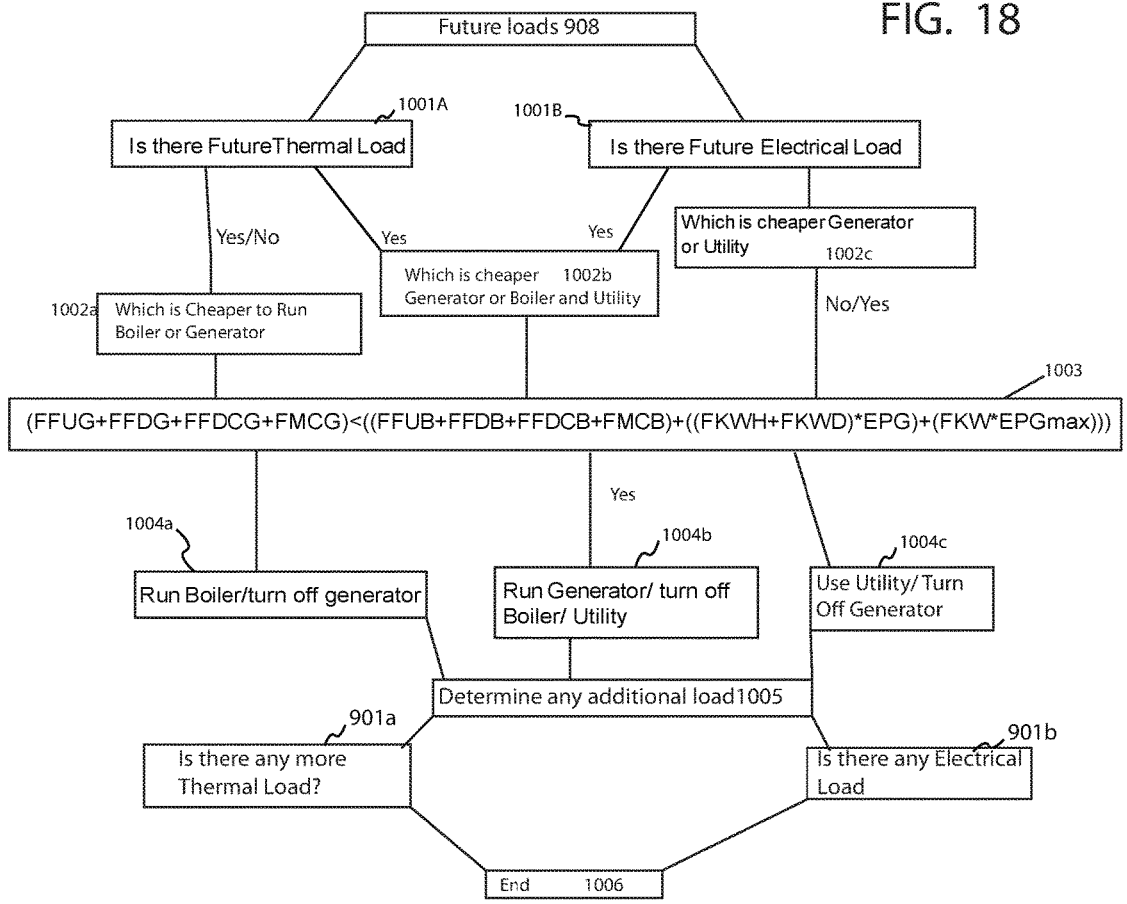
FIG. 18 is a flow chart for determining whether to turn off a co-generation system.

FIG. 18 is the process for determining whether to shut down a particular heat or electricity producing source or to switch to an alternative heat or electricity producing source based upon future loads and future prices for meeting those loads.

For example step 1001 $a$ includes the step of determining whether there is a future thermal load. Step 1001 $b$ includes determining whether there is a future electrical load. If there is only a future thermal load then the system proceeds to step 1002 $a$ wherein the system runs the formula in step 1003 relating to the future costs for running either the generator or boiler for meeting the future thermal load.

Step 1003 involves using the following formula:

$$(FFUG+FFDG+FFDCG+FMCG)<(FFUB+FFDB+FFDCB+FMCB)+(FKWH+FKWD)*EPG)+(FKW*EPGmax)$$

(FFUB+FFDB+FFDCB+FMCB) are the future heat and operating costs for the boiler;
(FFUG+FFDG+FFDCG+FMCG) are the future heating and operating costs for the generator; and
(FKWH+FKWD)*EPG+(FKW*EPGmax) is the future electrical costs wherein
FFU is the future cost of fuel per unit volume;
FFD is the future fuel cost in demand/charge/volume;
FFDC is the future fuel cost distribution charge/volume;
FMCG is the future maintenance charge for a generator;
FMCB is the future maintenance charge for a boiler;
FFUG is the cost of FFU for the generator/time;
FFUB is the cost of FFU for the boiler/time;
FFDG is the cost of FFD for the generator/time;
FFDB is the cost of FFD for the boiler/time;
FFDCG is the cost of FFDC for the generator/time; and
FFDCB is the cost of FFDC for the boiler/time.
FKW is the future electric demand cost;
FKWH is the future electric cost for usage; FKWD is the future electric cost for distribution;
and
EPG is the electricity produced by the generator during this time period;
EPGmax is the maximum amount of electricity produced by the generator during this time period in meeting the thermal load;
Depending on these future costs, the system can either determine whether to continue running the boiler in step 1004 $a$ or to alternatively run the generator in step 1004 $b$ or to simply run transfer power generation to the utility in step 1004 $c$. Next the system in step 1005 determines if there is any additional load. This then would start the process over again and return to steps 901 $a$ and/or 901 $b$ in FIG. 17. If there are no additional loads, and no future loads then the system can shut down in step 1005.

Figure 19:
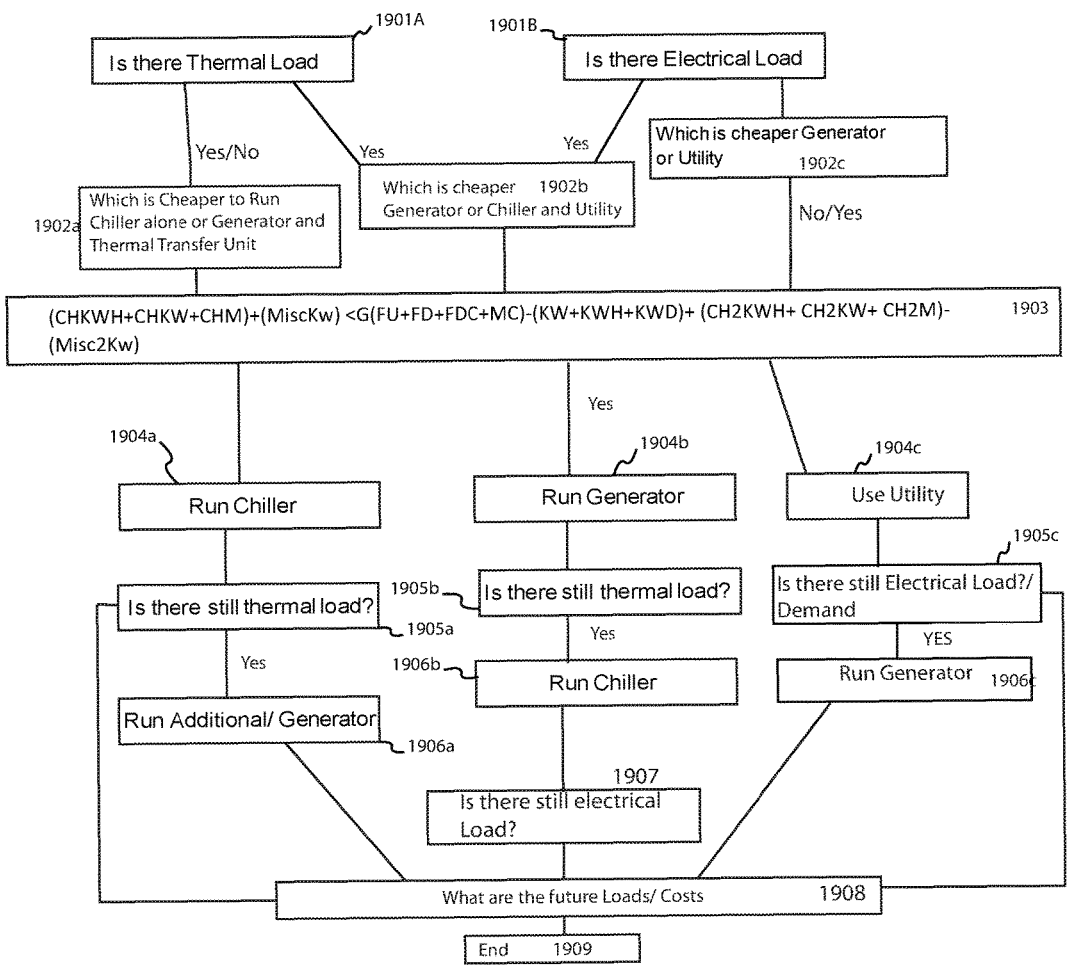
FIG. 19 is a flow chart for determining whether to operate the co-generation-chilling system.

FIG. 19 is a flow chart showing the process for determining whether to run the boiler or the generator or to use an electrical utility in circumstances where there is simultaneous, but independent thermal load and electrical load or thermal load alone or electrical load alone. This process is performed by the system which includes controller 90 and/or application server 203 and/or home computer 190. The processing is therefore performed using any one of microcontroller 92 and/or microcontroller 222. The process starts in step 1901$a$ wherein the system determines if there is a thermal load or step 1901$b$ where the system determines if there is electrical load If there is thermal load and no electrical load, then the system moves to step 1902$a$ where it determines whether it is less expensive to run the boiler or the generator in producing heat only. Alternatively if there is both thermal load and electrical load then the system moves to step 1902$b$. If there is only an electrical load then the system moves to step 1902$c$. Regardless of the answer, the system moves to step 1903 using the following formulas:

At a time interval ti (t1 . . . t2) is (GC−BC)<EC or alternatively is:

$$(CHKWH+CHKW+CHM)+(MiscKw)<G(FU+FD+FDC+MC)-(KW+KWH+KWD)+(CH2KWH+CH2KW+CH2M)-(Misc2Kw)$$

If yes then run electric chiller, if no then run generator and create electricity and chilled water as output.
Tons=tons of cooling provided by chiller
CHKWH=KwH per ton of electric Chiller KWH×Tons
KW is Kilowatts
KWH is Kilowatts per hour
KWD=Kilowatt demand
CHKW=KW demand for total tons of electric chiller
CHM=Maintenance Cost demand to run the electric pumps, cooling tower
FU=Fuel Usage
FD=Fuel Usage Demand
FDC=Fuel Demand Charge
MC=maintenance cost per hour
MiscKw=Cost of demand+usage of ancillary The terms FU, FD, FDC, MC, KW, KWH and KWD are defined above with respect to the formula shown in FIG. 15. The terms CH and G are presented to represent where the costs are associated such as CH for chiller or G for generator. In addition, these above variables include any additional charges such as any appropriate taxes that are to be included in calculating these amounts. The terms KW, KWH and KWD are used in this equation at current electrical rates and therefore take a credit for cost of operating the defrayed cost of electricity from the electrical grid.

In another way,
GC*EG=TL; or
CHC*EB=TL wherein
GC is the cost of running the generator to produce the heat;
CHC is the cost of running the chiller to produce the heat
EG is the efficiency of the generator in meeting the thermal load; and
ECH is the efficiency of the boiler in meeting the thermal load.

Because the chiller is generally considered more efficient at reducing heat, ECH will generally be higher than EG. However a chiller does not produce electricity, therefore, the positive by product of the cogenerator, that of electrical power may overcome this difference in efficiency by the cost savings of a building not having to turn to outside power utilities.

Thus, if it is determined that it is less expensive to run the chiller or "YES" to the above equation, then the boiler such as boiler 60 or 70 is started in step 1904$a$. Alternatively, if it is less expensive to run the generator regardless of whether there is an electrical load, then the system proceeds to step to start and run the generator 20 in step 1904$b$. If there is no thermal load and the system determines that it is less expensive to access the utility than generate electricity using the generator then the system proceeds to step 1904$c$.

For example, while the above formula is used if there is both thermal load and electrical load the same but simplified formula can be used to determine whether to run the boiler or the generator when there is no electrical output or demand:

$$(CH(FU+FD+FDC+MC)<(G(FU+FD+FDC+MC)$$

This formula determines whether the cost of running the generator with no electrical output is less expensive than the cost for reducing heat from the chiller.

Proceeding from step 1904*a*, once the boiler is running, if there is still additional thermal load and a thermal demand as determined in step 1905*a*, and the capacity of the chiller cannot meet all of the thermal demand, then the system can be configured to run the additional generator in step 1906*a*. If there is no additional thermal load or no thermal load at all and no demand then the system proceeds to step 1908 to determine whether there are future loads or costs. This step is outlined in greater detail in FIG. 20 and is used to anticipate whether to switch from the boiler to the generator, or from the generator to the boiler or from the generator to the electrical utility or from the electrical utility to the generator based upon periodic changes in fuel rates and electrical utility rates.

If the generator is running in step 1904*b* then the system also determines whether there is additional thermal load in step 1905*b*. If yes then it proceeds to step 1906*b* to start the additional heating unit such as the boiler. If there is also an additional electrical load then it proceeds to step 1907 to access power from the electrical utility as well. As there should be no interruption from power, this step 1907 can be performed at any stage in the process, particularly earlier than presented.

Alternatively, if there is an electrical load 1907, and no thermal load, then the system determines whether it is less expensive to use the generator or a utility. This is performed using the formula shown in step 1903. However, in this case, if there is no thermal demand, then the formula is as follows for meeting electrical demand:

$$(G(FU+FD+FDC+MC)<(KW+KWH+KWD))$$

This formula determines whether the cost of running the generator with no heat output is less expensive than the cost for obtaining electricity from the electrical utility. This type of analysis would typically be performed in the warmer months when there is no heat demand for building heat and Chiller 60 does not currently demand heat reduction.

If yes, then the system proceeds to step 1904*b* to run the generator 20. Alternatively, if no, then the system proceeds to step 1904*c* to simply rely on electrical energy from the utility.

If there is still an electrical load or a demand as considered in step 1905*c* then the system can proceed to step 1906*c* to start the generator as well. Next, in determining whether to turn off the generator, or to switch from the electrical utility to the generator for future electrical use, the system can consider future costs for fuel, and electrical rates in step 1908.

Figure 20:
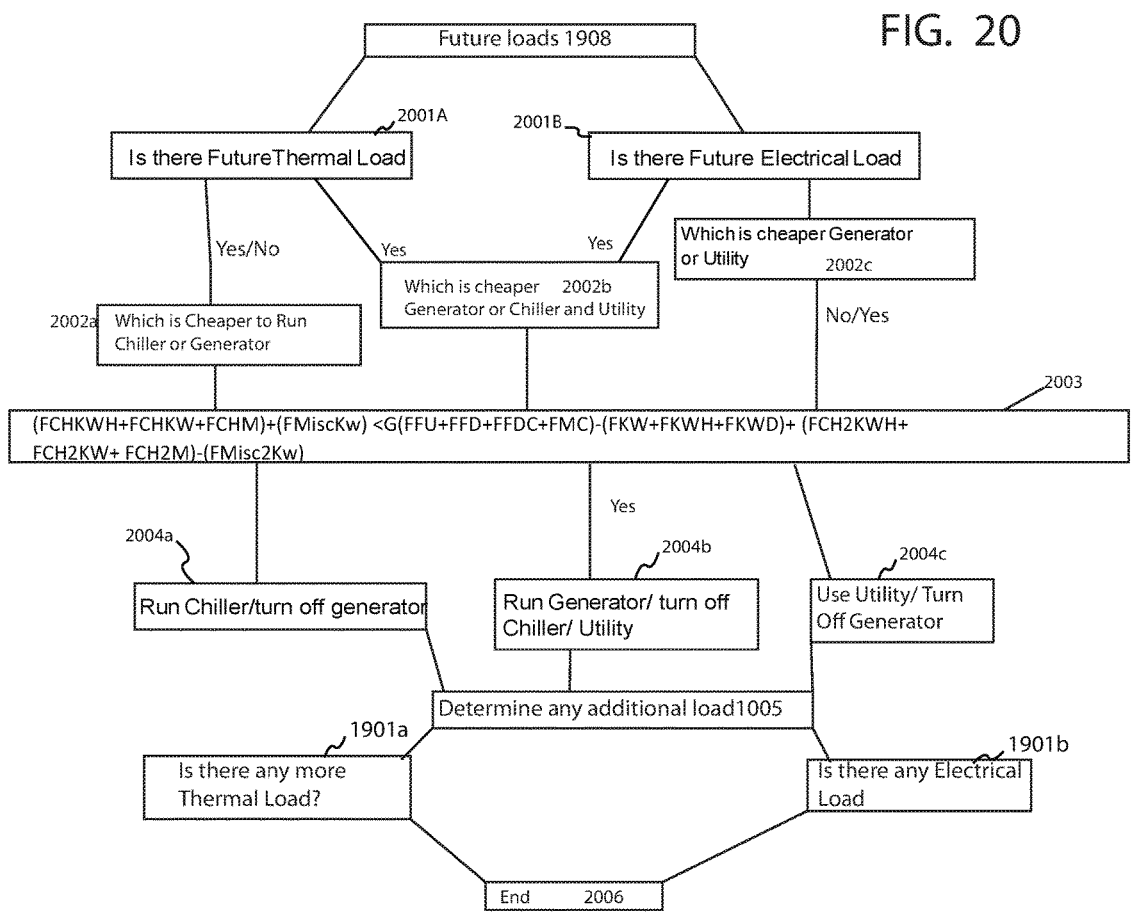
FIG. 20 is a flow chart for determining whether to turn off the co-generation-chilling system.

FIG. 20 is the process for determining whether to shut down a particular heat or electricity producing source or to switch to an alternative heat or electricity producing source based upon future loads and future prices for meeting those loads.

For example step 2001*a* includes the step of determining whether there is a future thermal load. Step 2001*b* includes determining whether there is a future electrical load. If there is only a future thermal load then the system proceeds to step 2002*a* wherein the system runs the formula in step 2003 relating to the future costs for running either the generator or boiler for meeting the future thermal load.

Step 2003 involves using the following formula:

These above variables include any additional charges such as any appropriate taxes that are to be included in calculating these amounts.

$$(FCHKWH+FCHKW+FCHM)+(FMiscKW)<G(FFU+FFD+FFDC+FMC)-(FKW+FKWH+FKWD)+(FCH2KWH+FCH2KW+FCH2M)-(FMisc2Kw)$$

If yes then continue to run electric and chiller, if no then run generator creating electricity and chilled water as output.

Tons=tons of cooling provided by chiller

FCHKWH=future KwH per ton of electric Chiller KWH× Tons

KW is Kilowatts

FKWH is future Kilowatts per hour

FKWD=future Kilowatt demand

FCHKW=Future ChillerKW demand for total tons of electric chiller

FCHM=Future Chiller Maintenance Cost demand to run the electric pumps, cooling tower FFU=Future Fuel Usage FFD=Future Fuel Usage Demand FFDC=Future Fuel Demand Charge FMC=Future maintenance cost per hour FMiscKW=Future Cost of demand+usage of ancillary Depending on these future costs, the system can either determine whether to continue running the boiler in step 2004*a* or to alternatively run the generator in step 2004*b* or to simply run transfer power generation to the utility in step 2004*c*. Next the system in step 2005 determines if there is any additional load. This then would start the process over again and return to steps 1901*a* and/or 1901*b* in FIG. 19. If there are no additional loads, and no future loads then the system can shut down in step 2006.

Below are five (5) examples of different scenarios based upon efficiency rates (EG); (EB), demand charges (KW) that result in different decisions for whether to run a generator or a boiler. The differences between the different examples may be because of different electrical demand charges (KW) which may occur at peak hours of electrical distribution during the day. For example, during the times of 3:00 P.M. and 7:00 P.M. an electrical utility may raise the costs or institute a demand charge (KW) for this time period because it there is much higher demand on the utility which may result in a strain on the infrastructure, resulting in power companies having to put additional generators on line or to cause rolling brownouts or blackouts. Therefore these charges may occur at different times of the day or even have varying levels of charges at different times of the year. In addition, changes in fuel costs or differences in either the efficiency of the generator (EG) or the efficiency of the boiler (EB) may result in different decisions to either run a generator or run a boiler and rely on an electrical utility.

The examples provided below use static amounts for both generator output in terms of power, for example (10,000 watts), and generator output in terms of heat for example (50,000 BTU). However, the formulas used above and in the below examples can be used with a dynamic system as well. Under the dynamic system, the generator can respond with varying levels of heat output and electrical output. In at least one embodiment, the varying levels can be nearly infinite which a fully variable system, in at least another embodiment the generator can have a limited number of pre-set levels such as for example, two (2) levels of output for heat and electricity, three (3) levels of output for heat and electricity, four (4) levels of output for heat and electricity; five (5) levels of heat and electricity; six (6) levels of heat and electricity; seven (7) levels of heat and electricity; eight (8) levels of heat and electricity; nine (9) levels of heat and electricity; ten (10) levels of heat and electricity or even higher number of levels of heat and electricity.

Under the dynamic type system the system comprising any one of controllers 90 and 220 including any one of processors 92 and 222 can calculate the appropriate levels of dynamic setting for the generator to efficiently meet the thermal load and to ultimately satisfy the thermal demand. Thus, the formula F1 applied in FIG. 17 can be applied individually at each time period for each level the generator is set during the time the generator is running to meet the thermal load. The dynamic system including any one of processor 92 or 222 can look at a thermal demand, and thermal load, and then pre-calculate the most efficient heating pattern for the generator vs. the most efficient heating pattern for the boiler. Thus, the decision by the system to run either the boiler or the generator can be based upon a single setting across a single period of time as follows: For T1 apply F1

Or, under the dynamic system, the decision by the system can be based upon an average calculation of the costs on both sides of the equation as follows:

For *TD* apply *F*1(1)+ *F*1(2);*F*1(3);*F*1(4);*F*1(5);*F*1(6) ... *F*1(*N*)/*N*

This process would include finding the average cost to run the generator (GC) across N different settings, the average cost to run the boiler (BC) across N different settings and the average electrical costs (EC) across these N settings.

This can be expressed as the formula for determining whether to run the generator as is:

$$(GC(1)+GC(2)+ \ldots GC(N))/N < ((BC(1)+BC(2) \ldots BC(N))/N) + (EC(1)+EC(2)+ \ldots (EC(N))/N)$$

For N different settings/time periods.

If the cost for running the generator across these time periods is less, then the system is configured to run the generator. If the cost for running the boiler and using the outside electrical provider is less, then the system is configured to run the boiler.

EXAMPLE 1

| Electric Utility Demand Charge and Thermal Load of 50,000 Units | | |
|---|---|---|
| Generator Information | | |
| Generator Output (EPG) | 10,000 | Watts |
| Heat Output (HOG) | 50000 | BTUH |
| Heat Efficiency (EG) | 0.25 | Percent |
| Consumption | 200000 | BTUH |
| CCF Conversion | 1.960784 | CCF |
| Generator Maintenance Cost Costs $750 per year MC | 0.106947 | $/hr |
| Gas Charges | | |
| Usage | 0.54945 | $/CCF |
| Distribution | 0.37606 | $/CCF |
| Demand | 0 | $/CCF |
| Boiler Information | | |
| B. EFF.(EB) | 0.85 | Percent |
| Consumption | 58823.53 | BTUH |
| CCF Conversion | 0.576701 | |
| Boiler Maintenance Costs MC: | 0.028519 | $/Hr |
| Thermal Load | 50000 | btuh |

| Electrical Charges | | | |
|---|---|---|---|
| KWH Charge | | KW Charge | |
| Utility | 0.1043 KWH | 1.00 | KW |
| Distributor | 0.06 KWH | | |
| Total: | 0.1643 KWH | | |

| Generator Costs per hour | | Boiler costs per hour | | Electricity Costs per Hour | |
|---|---|---|---|---|---|
| FU | $1.077353 | FU | $0.316869 | KW | $10.00 |
| FD | $0 | FD | $0 | KWH | $1.043 |
| FDC | $0.737373 | FDC | $0.216874 | KWD | $0.6 |
| MC | $0.106947 | MC | $0.028519 | | |

Equation - All units converted to cost per hour

G(FU + FD + FDC + MC) < B(FU + FD + FDC + MC) + (KW + KWH + KWD)
(.359118 + 0 + .245791 + .0855) < (.316869 + 0 + .216874 + .028519) + (100 + 1.043 + .06)
1.921673 < 0.562262 + $11.64
$1.921673 < $12.21
Cost to Run Generator is less than boiler and electric utility

EXAMPLE 2

No Electric Utility Demand Charge

| Generator Information | | |
|---|---|---|
| Generator Output | 10,000 | Watts |
| Heat Output | 50000 | BTUH |
| Heat Efficiency (EG) | 0.25 | Percent |
| Consumption | 200000 | BTUH |
| CCF Conversion | 1.960784 | CCF |
| Generator Maintenance Cost | 0.106947 | $/hr |
| Costs $750 per year MC | | |

| Gas Charges | | |
|---|---|---|
| Usage | 0.54945 | $/CCF |
| Distribution | 0.37606 | $/CCF |
| Demand | 0 | $/CCF |

| Boiler Information | | |
|---|---|---|
| Boiler Eff (EB) | 0.85 | Percent |
| Consumption | 58823.53 | BTUH |
| CCF Conversion | 0.576701 | |
| Boiler Maintenance Cost MC | 0.028519 | $/Hr |
| Thermal Load | 50000 | btuh |

| Electrical Charges | | | |
|---|---|---|---|
| KWH Charge | | KW Charge | |
| Utility | 0.1043 KWH | $ — | |
| KW Distribution | 0.06 KWH | | |
| Total: | 0.1643 KWH | | |

| Generator Costs per hour | | Boiler costs per hour | | Electricity Costs per Hour | |
|---|---|---|---|---|---|
| FU | 1.077353 | FU | 0.316869 | KW | $ — |
| FD | 0 | FD | 0 | KWH | $1.043 |
| FDC | 0.737373 | FDC | 0.216874 | KWD | $0.6 |
| MC | 0.106947 | MC | 0.028519 | | |

Equation

G(FU + FD + FDC + MC) < B(FU + FD + FDC + MC) + (KW + KWH + KWD)
1.921673 < 0.562262 + $1.64
1.921673 < $2.21
Cost to Run Generator is less than boiler and electric utility

EXAMPLE 3

THERMAL LOAD In The BUILDING But The ELECTRICAL UTILITY DOES NOT HAVE A DEMAND CHARGE. THIS SITUATION ALSO INCLUDES HIGHER FUEL CHARGES THAN IN EXAMPLES 1 And 2.

| Generator Information | | |
|---|---|---|
| Generator Output | 10,000 | Watts |
| Heat Output | 50000 | BTUH |
| Heat Efficiency (EG) | 0.25 | Percent |
| Consumption | 200000 | BTUH |
| CCF Conversion | 2.173913 | Gallon |
| Generator Maintenance Cost | 0.106947 | $/hr |
| Costs $750 per year MC | | |
| LP Gas Charges Usage | 2.56 | $/gallon |

| Boiler Information | | |
|---|---|---|
| Boiler Eff (EB) | 0.85 | Percent |
| Consumption | 50000 | BTUH |

|  |  |
|---|---|
| CCF Conversion | 0.490196 |
| Boiler Maint. Cost )(MC) | 0.028519 $/Hr |
| Thermal Load | 50000 btuh |

Electrical Costs

| | KWH Charge | | KW Charge |
|---|---|---|---|
| Utility | 0.1043 KWH | | $ — KW |
| Distribution | 0.06 KWH | | |
| Total: | 0.1643 KWH | | |

| Generator Costs per hour | | Boiler costs per hour | | Electricity Costs per Hour | |
|---|---|---|---|---|---|
| FU | 5.565217 | FU | 1.254902 | KW | $ — |
| FD | 0 | FD | 0 | KWH | $1.043 |
| FDC | 0 | FDC | 0 | KWD | 0.6 |
| MC | 0.106947 | MC | 0.028519 | | |

Equation

G(FU + FD + FDC + MC) < B(FU + FD + FDC + MC) + (KW + KWH + KWD)
$5.672165 < $1.283421 + $1.64
$5.672165 < $2.93
Cost to Run Generator is more than boiler and electric utility

EXAMPLE 4

No Building Need For Electricity (Kw) With Thermal Load And Net Metering Of The Electric Utility Meter

Generator Information

| | |
|---|---|
| Generator Output | 10,000 Watts |
| Heat Output | 50000 BTUH |
| Heat Efficiency (EG) | 0.25 Percent |
| Consumption | 200000 BTUH |
| CCF Conversion | 1.960784 CCF |
| Generator Maintenance Cost | 0.106947 $/hr |
| Costs $750 per year MC | |

Boiler Information

| | |
|---|---|
| Boiler Eff (EB) | 0.85 Percent |
| Consumption | 58823.53 BTUH |
| CCF Conversion | 0.576701 |
| Boiler Maintenance Cost MC | 0.028519 $/Hr |

Gas Charges

| | |
|---|---|
| Usage | 0.54945 $/CCF |
| Distribution | 0.37606 $/CCF |
| Demand | 0 $/CCF |
| Thermal Load | 50000 btuh |

| Generator Costs per hour | | Boiler costs per hour | | Electricity Costs per Hour | |
|---|---|---|---|---|---|
| FU | 1.077353 | FU | 0.316869 | KW | $ — |
| FD | 0 | FD | 0 | KWH | 1.043 |
| FDC | 0.737373 | FDC | 0.216874 | KWD | 0.6 |
| MC | 0.106947 | MC | 0.028519 | | |

Electrical Costs

| | KWH Charge | | KW Charge |
|---|---|---|---|
| Utility | 0.1043 KWH | | $ — KW |
| Distribution | 0.06 KWH | | |
| Total: | 0.1643 KWH | | |

-continued

| Equation |
|---|
| G(FU + FD + FDC + MC) < B(FU + FD + FDC + MC) + (KW + KWH + KWD) |
| $1.921673 < 0.562262 + $1.64 |
| $1.921673 < $2.21 |
| Cost to Run Generator is less than boiler and electric utility meter will accept generated electricity back into grid with Net Meter. |

EXAMPLE 5

Fifty Percent Thermal Load Generator Is 18% Less Efficient On Fuel Consumption And Generates 50% Of Electricity

| Generator Information | | |
|---|---|---|
| Generator Output | 10,000 | Watts |
| Heat Output | 50000 | BTUH |
| Heat Efficiency (EG) | 0.2 | Percent |
| Consumption | 250000 | BTUH |
| CCF conversion | 2.45098 | CCF |
| Generator Maintenance Cost | 0.106947 | $/hr |
| Costs $750 per year MC | | |

| Boiler Information | | |
|---|---|---|
| Boiler Eff (EB) | 0.85 | Percent |
| Consumption | 29411.76 | BTUH |
| CCF Conversion | 0.288351 | |
| Boiler Maintenance Cost MC | 0.028519 | $/Hr |

| Gas Charges | | |
|---|---|---|
| Usage | 0.54945 | $/CCF |
| Distribution | 0.37606 | $/CCF |
| Demand | 0 | $/CCF |
| Thermal Load | 25000 | btuh |

| Electrical Costs | | | | |
|---|---|---|---|---|
| KWH Charge | | | KW Charge | |
| Utility | 0.1043 | KWH | $ — | KW |
| Distribution | 0.06 | KWH | | |
| Total: | 0.1643 | KWH | | |

| Generator Costs per hour | | Boiler costs per hour | | Electricity Costs per Hour | |
|---|---|---|---|---|---|
| FU | 1.346691 | FU | 0.158434 | KW | $ — |
| FD | 0 | FD | 0 | KWH | 1.043 |
| FDC | 0.921716 | FDC | 0.108437 | KWD | 0.6 |
| MC | 0.106947 | MC | 0.028519 | | |

| Equation |
|---|
| G(FU + FD + FDC + MC) < B(FU + FD + FDC + MC) + (KW + KWH + KWD) |
| $2.375354 < 0.295391 + $1.64 |
| $2.375354 < $1.94 |
| Cost to run generator is more than running boiler |

Thus, this system and process includes an automatically controlled system which includes a controller comprising a microprocessor which is configured to run at least one algorithm to determine whether to run a generator or a boiler when confronted with at least one of a thermal demand or electrical demand and whether to keep running either a generator or a boiler based upon future electrical load or demand or future heat load or heat demand.

Accordingly, while at least one embodiment of the present invention have been shown and described, it is to be understood that many changes and modifications may be made thereunto without departing from the spirit and scope of the invention as defined in the appended claims.

What is claimed is:

1. A system configured to determine whether to operate a cogenerator in a cogeneration system comprising;
   a) at least one microprocessor;
   b) at least one memory in communication with said at least one microprocessor;
   c) at least one generator in communication with said at least one microprocessor;

wherein said at least one memory is configured to store information relating to the current fuel price, and the cost of energy production;

d) at least one manifold coupled to said generator said manifold comprising at least one valve, and wherein said at least one manifold being configured to convey at least one fluid;

wherein said at least one microprocessor is configured to determine whether to operate a generator based upon said current fuel price, and said cost of energy production and wherein said at least one microprocessor controls said at least one generator and said at least one manifold to turn on said at least one generator and to open said at least one valve in said manifold.

2. The system as in claim 1, further comprising at least one housing coupled to said generator, wherein said at least one microprocessor is disposed in said at least one housing.

3. The system as in claim 1, further comprising:
a) at least one communication port in communication with said microprocessor, and
b) a computer network in communication with said at least one communication port.

4. The system as in claim 3, wherein said computer network comprises at least one router and wherein said communication port further comprises addressable circuitry configured to provide said communication port an address on said computer network.

5. The system as in claim 1, wherein said manifold further comprises at least one pump, wherein said at least one microprocessor is configured to selectively activate said at least one pump.

6. The system as in claim 1, wherein said manifold further comprises at least one fluid conduit.

7. The system as in claim 1, wherein said manifold further comprises at least one heat exchanger.

* * * * *